United States Patent
Reuter et al.

(10) Patent No.: US 11,518,357 B2
(45) Date of Patent: Dec. 6, 2022

(54) HYDRAULIC CONTROL UNIT WITH PISTON PUMP

(71) Applicant: BWI (Shanghai) Co., Ltd., Shanghai (CN)

(72) Inventors: David Fredrick Reuter, Moraine, OH (US); Sury Peddireddi, Moraine, OH (US); Sourabh Jain, Maharashtra (IN); Moresh Deshpande, Maharashtra (IN)

(73) Assignee: BWI (SHANGHAI) CO., LTD., Shanghai (CN)

( * ) Notice: Subject to any disclaimer, the term of this patent is extended or adjusted under 35 U.S.C. 154(b) by 537 days.

(21) Appl. No.: 16/660,052

(22) Filed: Oct. 22, 2019

(65) Prior Publication Data

US 2020/0130665 A1   Apr. 30, 2020

Related U.S. Application Data

(60) Provisional application No. 62/750,177, filed on Oct. 24, 2018.

(30) Foreign Application Priority Data

Aug. 7, 2019   (CN) .......................... 201910725302.8
Oct. 18, 2019   (CN) .......................... 201910994687.8

(51) Int. Cl.
*B60T 11/236*   (2006.01)
*B60T 8/40*   (2006.01)
(Continued)

(52) U.S. Cl.
CPC .......... *B60T 11/236* (2013.01); *B60T 8/4022* (2013.01); *B60T 8/4031* (2013.01); *B60T 13/662* (2013.01);
(Continued)

(58) Field of Classification Search
CPC ...... B60T 8/4022; B60T 8/4031; B60T 8/368; B60T 17/02; F04B 1/0439
See application file for complete search history.

(56) References Cited

U.S. PATENT DOCUMENTS 5,039,283 A  *  8/1991  Mergenthaler ........ F04B 1/0408
                                                417/273
6,215,215 B1 *  4/2001  Huber ..................... F04B 53/16
                                                310/86
(Continued)

FOREIGN PATENT DOCUMENTS

CN       1898112 A       1/2007
CN     101122795 A       2/2008
(Continued)

OTHER PUBLICATIONS

The extended European search report dated May 29, 2020 for counterpad European patent application No. 19205015.1.
(Continued)

*Primary Examiner* — Thomas E Lazo
(74) *Attorney, Agent, or Firm* — William H. Honaker; Dickinson Wright PLLC

(57) ABSTRACT

An electro-hydraulic control unit for a vehicle brake system includes a hydraulic control unit including an HCU block defining a motor bore containing an electric motor and an eccentric chamber containing a rotating eccentric driven by the electric motor. The HCU block also defines a pump bore containing a piston pump including a piston rod having a generally cylindrical shape with a smooth exterior surface extending substantially its entire length. An end cap is press fit around an end of the piston rod and includes a flange portion extending annularly outwardly for engaging a return spring. A piston guide includes a tubular portion guiding the piston rod and a shoulder for engaging the return spring. A throat of the piston guide holds a gland seal surrounding the
(Continued)

piston rod. An outlet valve housing includes a tubular protrusion extending into the throat of the piston guide to hold the gland seal.

24 Claims, 18 Drawing Sheets

(51) Int. Cl.
  *B60T 13/66* (2006.01)
  *F16K 31/52* (2006.01)
  *F04B 1/0439* (2020.01)
  *F16J 7/00* (2006.01)

(52) U.S. Cl.
  CPC ............ *F04B 1/0439* (2013.01); *F16K 31/52* (2013.01); *F16J 7/00* (2013.01)

(56) References Cited

U.S. PATENT DOCUMENTS

| | | | | |
|---|---|---|---|---|
| 6,457,956 | B1* | 10/2002 | Hauser | F04B 53/126 |
| | | | | 417/470 |
| 6,641,232 | B1* | 11/2003 | Alaze | B60T 8/4068 |
| | | | | 417/536 |
| 6,848,890 | B2* | 2/2005 | Nakazawa | F04B 1/0404 |
| | | | | 92/147 |
| 6,866,489 | B2 | 3/2005 | Hinz et al. | |
| 7,475,952 | B2* | 1/2009 | Reuter | B60T 8/4031 |
| | | | | 303/117.1 |
| 9,611,840 | B2* | 4/2017 | Celotta | F04B 9/045 |
| 10,385,833 | B2* | 8/2019 | Norberg | F04B 53/126 |
| 2003/0101970 | A1* | 6/2003 | Utsumi | F04B 1/0404 |
| | | | | 123/495 |
| 2004/0187677 | A1* | 9/2004 | Moradmand | F04B 1/0413 |
| | | | | 92/72 |
| 2007/0289442 | A1 | 12/2007 | Waller et al. | |
| 2008/0191549 | A1* | 8/2008 | Giering | F04B 1/053 |
| | | | | 303/116.4 |
| 2012/0177516 | A1* | 7/2012 | Mayr | F04B 39/121 |
| | | | | 417/437 |
| 2013/0156613 | A1 | 6/2013 | Reuter et al. | |
| 2015/0211514 | A1 | 7/2015 | Hoff | |
| 2017/0174195 | A1* | 6/2017 | Sagayama | F16H 1/28 |
| 2018/0245573 | A1 | 8/2018 | Maruo et al. | |

FOREIGN PATENT DOCUMENTS

| | | |
|---|---|---|
| CN | 101277859 A | 10/2008 |
| CN | 201381959 U | 1/2010 |
| CN | 102939461 A | 2/2013 |
| CN | 104936856 A | 9/2015 |
| CN | 105984451 A | 10/2016 |
| CN | 106715900 A | 5/2017 |
| CN | 208264236 U | 12/2018 |
| DE | 19706124 A1 | 8/1998 |
| DE | 10013858 A1 | 9/2001 |
| DE | 10341139 A1 | 3/2005 |
| DE | 102004058726 A1 | 6/2006 |
| DE | 102010001237 A1 | 6/2011 |
| JP | 3041422 U | 9/1997 |
| JP | 2007219092 A | 8/2007 |
| WO | 2007131302 A1 | 11/2007 |

OTHER PUBLICATIONS

Examination Report dated Dec. 11, 2020 for counterpart Indian patent application No. 201934042696.
First Office Action and search report dated Jun. 30.2021 for counterpart Chinese patent application No. 201910994687.8.
First Office Action issued for corresponding Japanese Patent Application 2019-192877 dated May 11, 2021.
Office Action and Search Report dated Mar. 16, 2020 for counterpart Chinese patent application No. 201910725302.8.
European search report dated Feb.3, 2020 for counterpart European patent application No. 19205015.1.

* cited by examiner

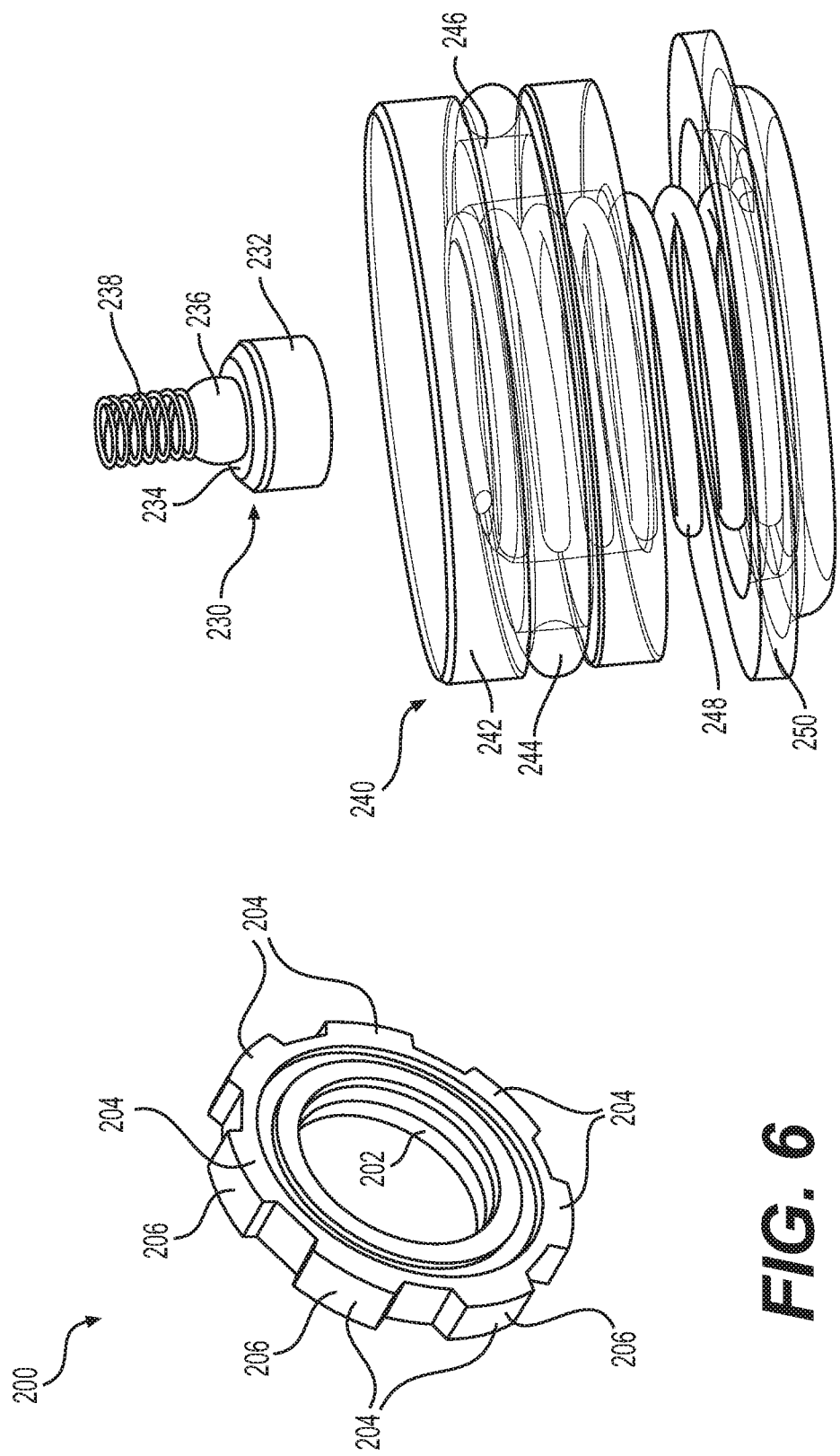

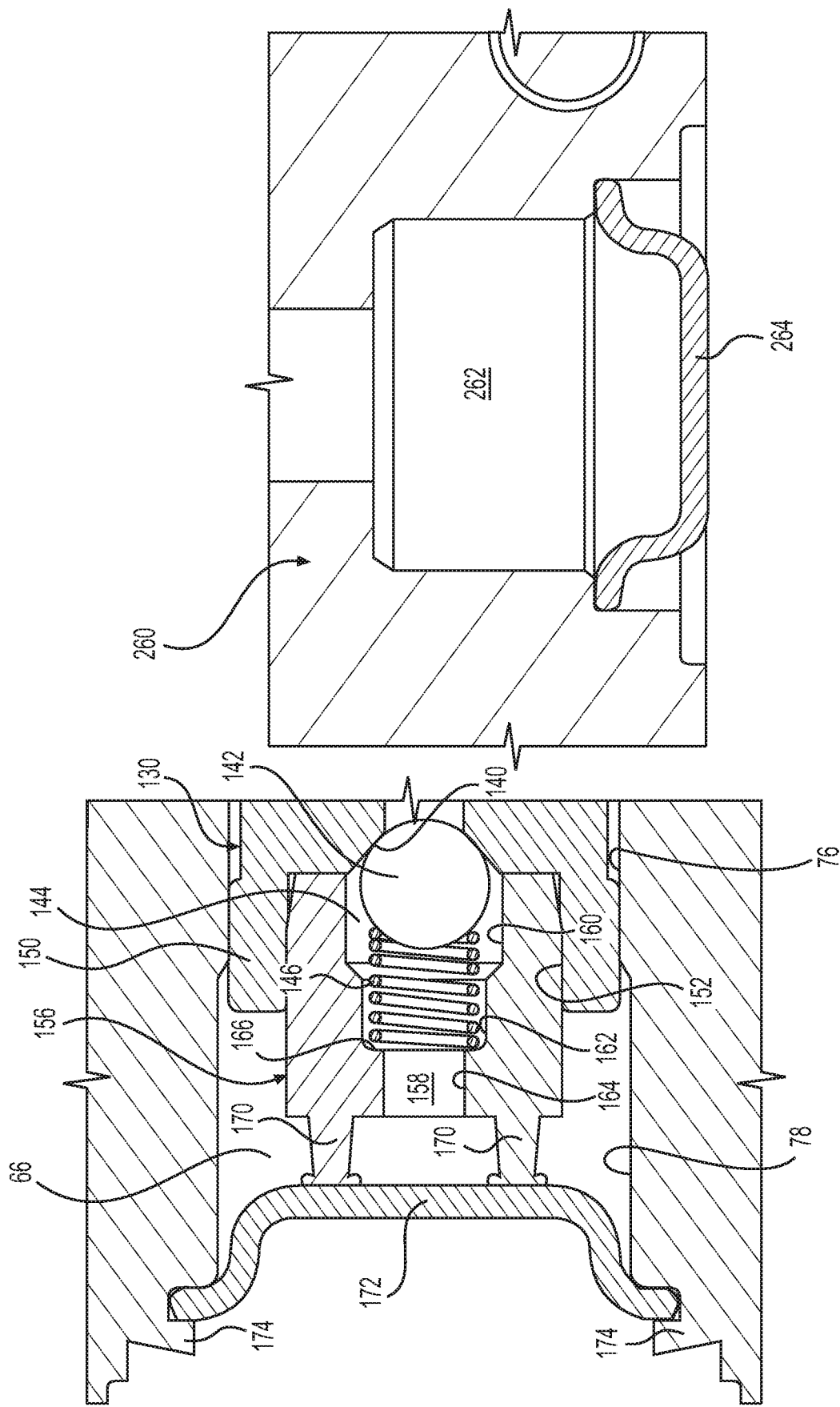

HYDRAULIC CONTROL UNIT WITH PISTON PUMP

CROSS-REFERENCE TO RELATED APPLICATIONS

This U.S. utility patent application claims the benefit of U.S. Provisional Patent Application Ser. No. 62/750,177 filed Oct. 24, 2018 entitled "Hydraulic Control Unit with Piston Pump". This application also claims the benefit of Chinese Patent Application No. 201910725302.8 filed on Aug. 7, 2019, and Chinese patent application no. 201910994687.8 filed on Oct. 18, 2019. The content of which are incorporated herein by reference in their entirety.

BACKGROUND OF THE INVENTION

1. Field of the Invention

The present invention relates to a hydraulic control unit of an electro-hydraulic control unit for a vehicle brake system.

2. Description of the Prior Art

It is generally known in the field of electro-hydraulic control units for vehicle brake systems to include a hydraulic control unit with a piston pump. Conventional piston pumps include a piston rod extending through a piston guide, and which is moved axially by a rotating eccentric driven by an electric motor. Conventional piston pumps may include a female gland seal held in a fixed position surrounding the piston rod as the piston rod moves therethrough. An example of such an assembly is disclosed in U.S. Pat. No. 6,866,489.

SUMMARY OF THE INVENTION

The present disclosure provides for a hydraulic control unit (HCU) including an HCU block defining an eccentric chamber containing a rotating eccentric. The hydraulic control unit also includes a piston guide having a first tubular portion that extends along a pump axis with a cylindrical first inner surface receiving a piston rod for allowing the piston rod to translate freely only in an axial direction. The first tubular portion also has a generally cylindrical first outer surface with a return spring disposed thereabout. The piston guide includes a base surface extending annularly and radially outwardly from the first inner surface and faces away from the eccentric chamber. A second tubular portion of the piston guide extends axially from the base surface opposite the first tubular portion and includes a cylindrical second inner surface, which is radially spaced apart from the piston rod to define a first throat therebetween. A gland seal is disposed in the first throat of the piston guide, surrounding the piston rod, to prevent leakage thereabout as the piston rod moves axially therethrough.

In accordance with another aspect of the disclosure, a hydraulic control unit includes an HCU block defining an eccentric chamber containing a rotating eccentric. A generally cylindrical piston rod extends along a pump axis between a first end and a second end, and has a smooth exterior surface extending substantially the entire length between the first end and the second end. An end cap is disposed around the first end of the piston rod adjacent the rotating eccentric and is fixed to move axially with the piston rod. The end cap includes a flange portion extending annularly outwardly from the piston rod. The hydraulic control unit also includes a piston guide defining a first shoulder extending annularly and radially outwardly and facing toward the eccentric chamber. The piston guide further includes a first tubular portion with a cylindrical first inner surface receiving the piston rod and allowing the piston rod to translate freely only in an axial direction. A return spring extends between the first shoulder of the piston guide and the flange portion of the end cap for biasing the piston rod axially toward the rotating eccentric.

In accordance with another aspect of the disclosure, a hydraulic control unit includes an HCU block defining an eccentric chamber containing a rotating eccentric. The HCU block defines a pump bore extending transversely from a face of the HCU block along a pump axis intersecting the eccentric chamber. The hydraulic control unit also includes a piston pump including a piston rod and an outlet valve housing defining an outlet valve seat for receiving an outlet closing member separating a pumping chamber from an outlet fluid chamber. An outlet spring retainer defines an internal ledge facing the eccentric chamber for engaging an outlet valve spring configured to bias the outlet closing member into the outlet valve seat. The outlet spring retainer also includes a plurality of tapered posts extending axially away from the eccentric chamber to engage an outlet cap for holding the piston pump in the pump bore of the HCU block. The tapered posts are configured to deform by a predetermined amount during assembly.

The subject invention provides for several advantages over the prior art. It provides for a hydraulic control unit design that is versatile to be used in different configurations and arrangements with one or more piston pumps driven by a common electric motor. It provides a piston pump that may be optimized for relatively low fluid flows, such as for motorcycle applications. It also provides several advantages for manufacturability, including a piston rod having a smooth external surface, and an external gland seal that is secured within the first throat of the piston rod. This design allows the pump assembly to be assembled and tested separate from the rest of the hydraulic control unit before being installed in the pump bore of the HCU block.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 6 is a perspective view of a spacer of the motor assembly of FIG. 5A;

FIG. 7 is a transparent perspective view of an accumulator assembly and an inlet check valve for a hydraulic control unit according to an aspect of the present disclosure;

FIG. 10 is a cross-sectional view of an enlarged portion within a hydraulic control unit according to an aspect of the present disclosure;

FIG. 11 is a cross-sectional view of an enlarged portion within a hydraulic control unit according to an aspect of the present disclosure;

DESCRIPTION OF THE ENABLING EMBODIMENT

Figure 1:
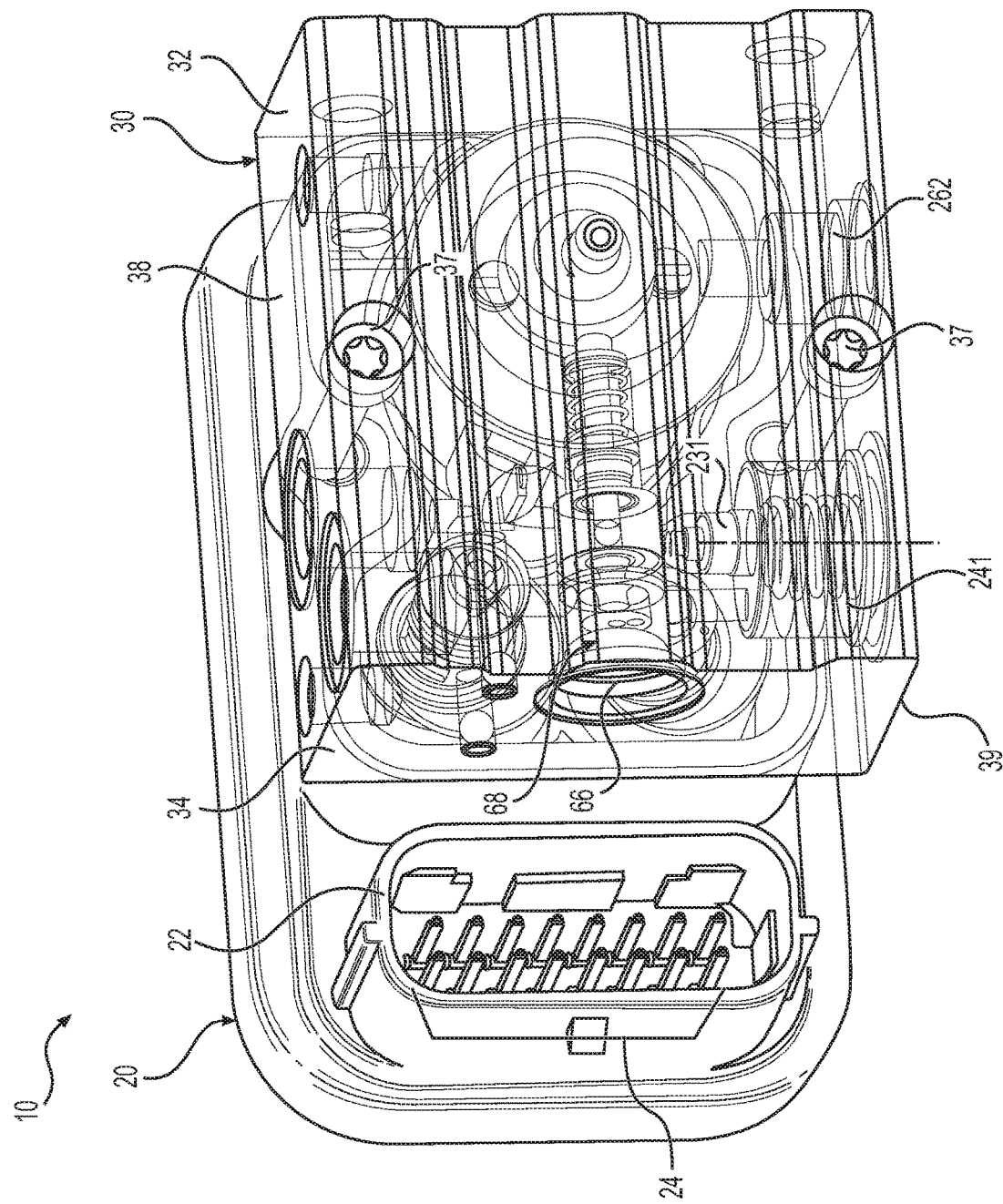
FIG. 1 is perspective view of an electro-hydraulic control unit of the present disclosure.

Referring to the Figures, wherein like numerals indicate corresponding parts throughout the several views, an electro-hydraulic control unit 10 for a vehicle brake system is generally shown in FIG. 1. The electro-hydraulic control unit 10 includes an electronic control unit 20 having an electrical interface 22 for providing electrical power and communications to external systems and devices. The electro-hydraulic control unit 10 also includes a hydraulic control unit 30 to provide and to control fluid pressure in the vehicle brake system.

Figure 2:
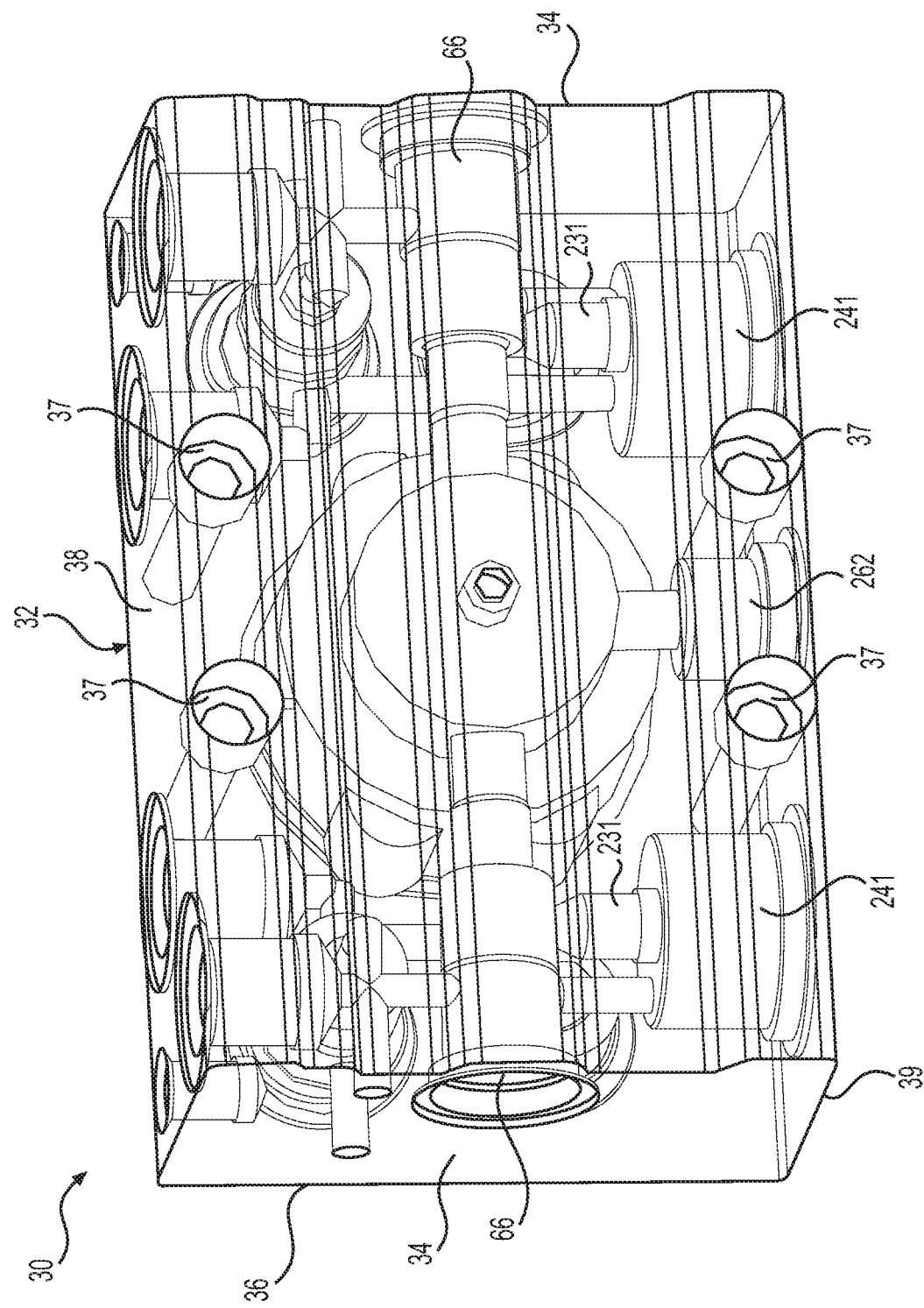
FIG. 2 is a partially-transparent two-channel hydraulic control unit of an electro-hydraulic control unit of the present disclosure.
Figure 3B:
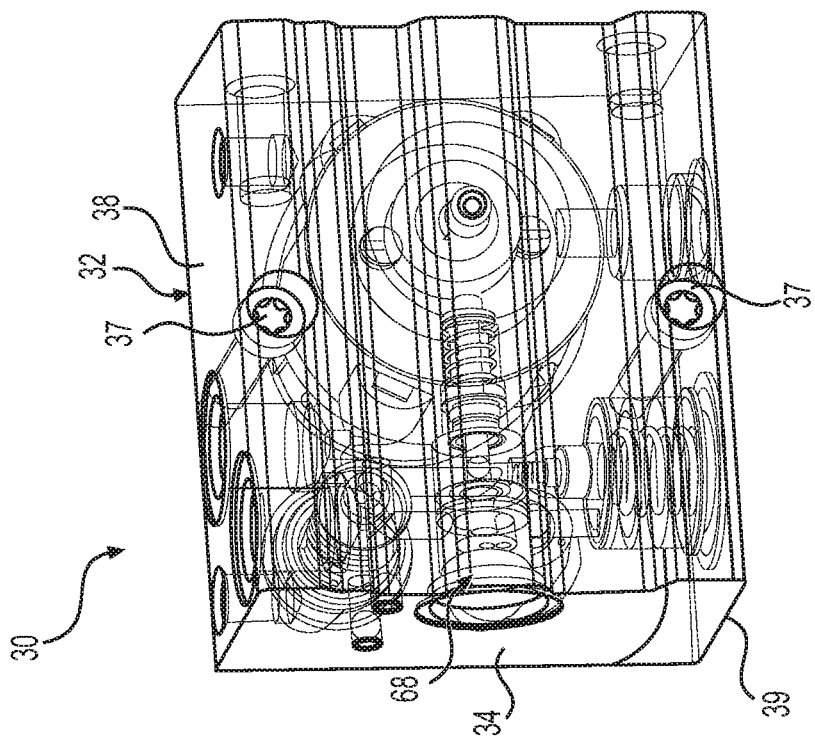
FIG. 3B is a front view of the single-channel hydraulic control unit of FIG. 3A.
Figure 3A:
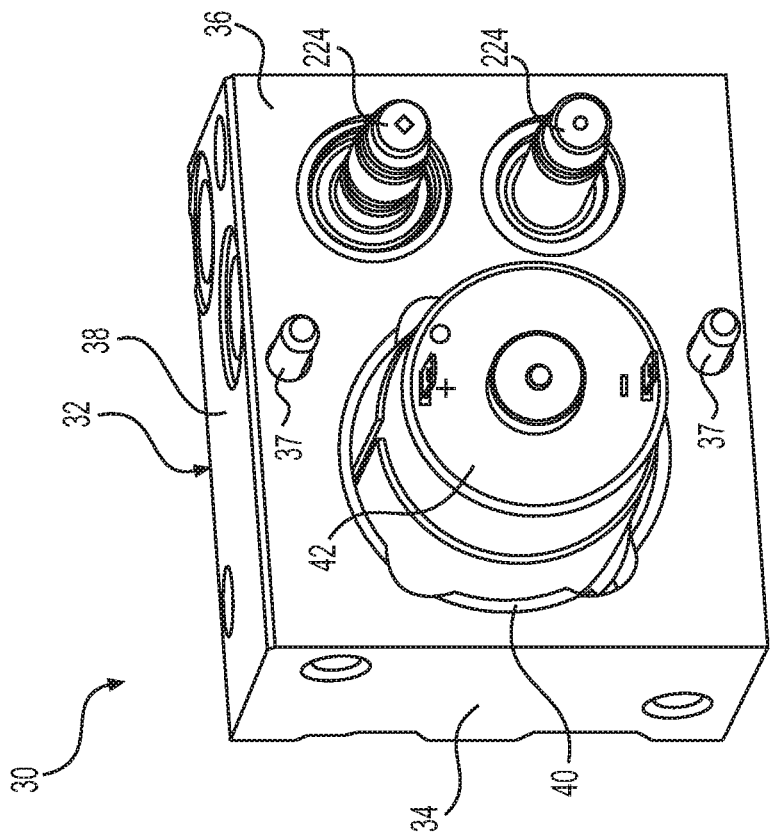
FIG. 3A is a rear view of a single-channel hydraulic control unit of an electro-hydraulic control unit of the present disclosure.

The hydraulic control unit 30 includes an HCU block 32 of solid metal material, as illustrated in FIGS. 2 and 3A-3B. The HCU block 32 is preferably formed as an extrusion of aluminum, having a constant cross-sectional profile extending between two opposite side faces 34, with a mating face 36 for abutting the electronic control unit 20 extending perpendicular to the side faces 34. The HCU block 32 is secured onto the electronic control unit 20 by a plurality of first fasteners 37, which are preferably screws, although bolts, clips, or other types of fasteners may be used. The HCU block 32 also extends between a top face 38 and a bottom face 39 parallel to the top face 38, with each of the top and bottom faces 38, 39 being transverse to the side faces 34 and the flat mating face 36.

As shown in FIG. 3A, the HCU block 32 defines a motor bore 40 having a cylindrical shape and containing an electric motor 42. As shown in cross-section on FIGS. 4 and 5B, the motor bore 40 extends transversely from the flat mating face 36 along a motor axis 44 to a floor 46 that is parallel to and spaced apart from the flat mating face 36. The HCU block 32 also defines an eccentric chamber 50 having a generally cylindrical shape extending about the motor axis 44 axially beyond the floor 46 of the motor bore 40 away from the flat mating face 36. The eccentric chamber 50 contains a rotating eccentric 52 with an eccentric core 54 driven by a motor shaft 58 of the electric motor 42. The rotating eccentric 52 also includes an eccentric bearing 56 surrounding the eccentric core 54.

Figure 4:
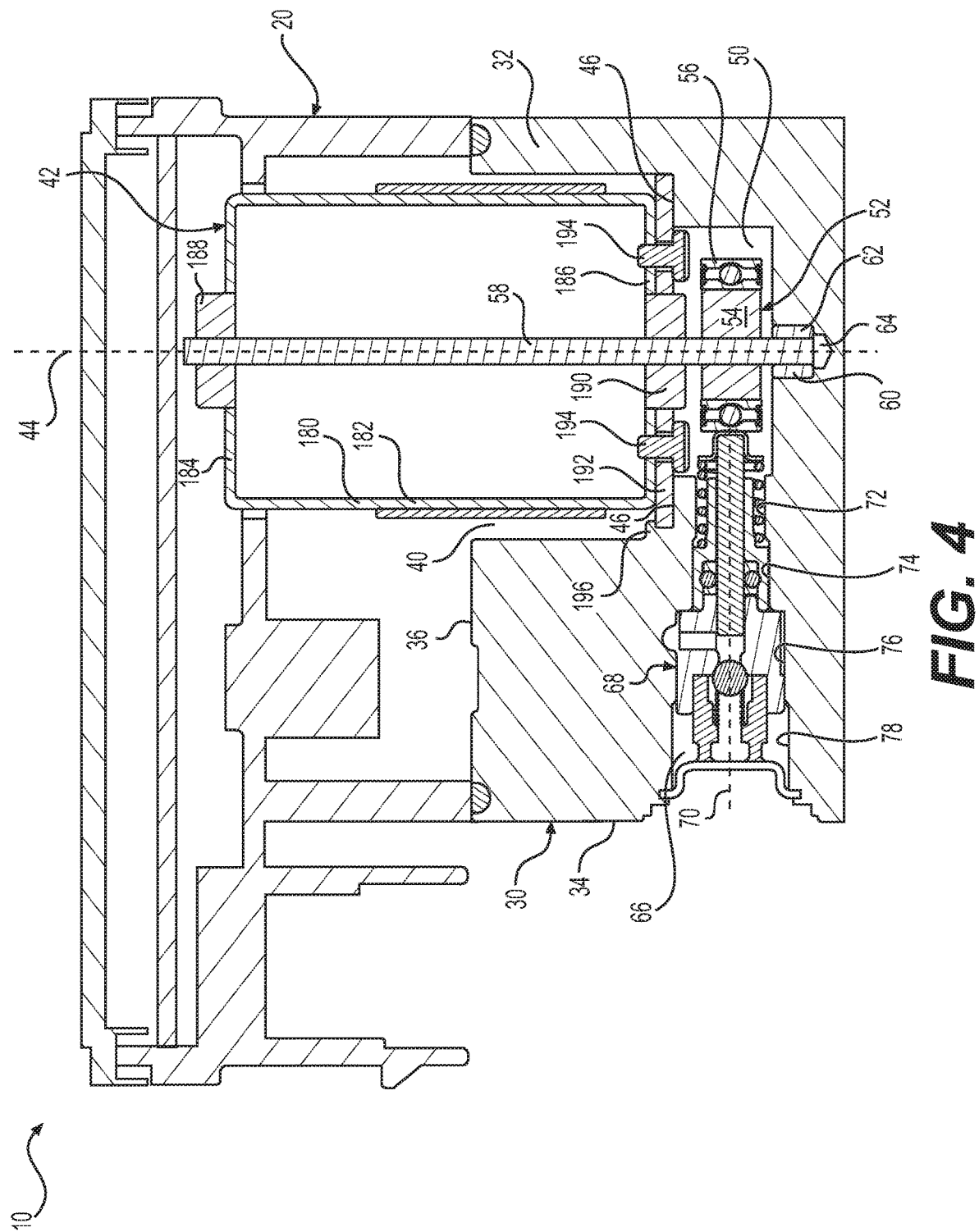
FIG. 4 is a cross-sectional view of the single-channel hydraulic control unit of the present disclosure.
Figure 5A:
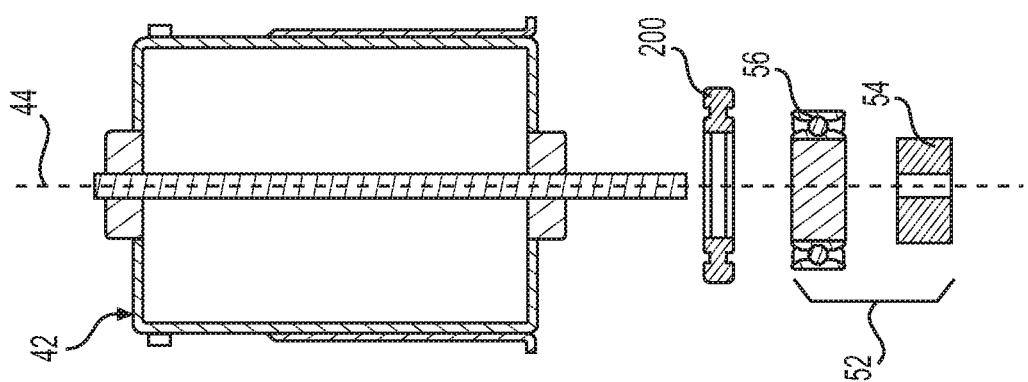
FIG. 5A is an exploded cross-sectional view of a motor assembly for a hydraulic control unit according to an aspect of the present disclosure.
Figure 5B:
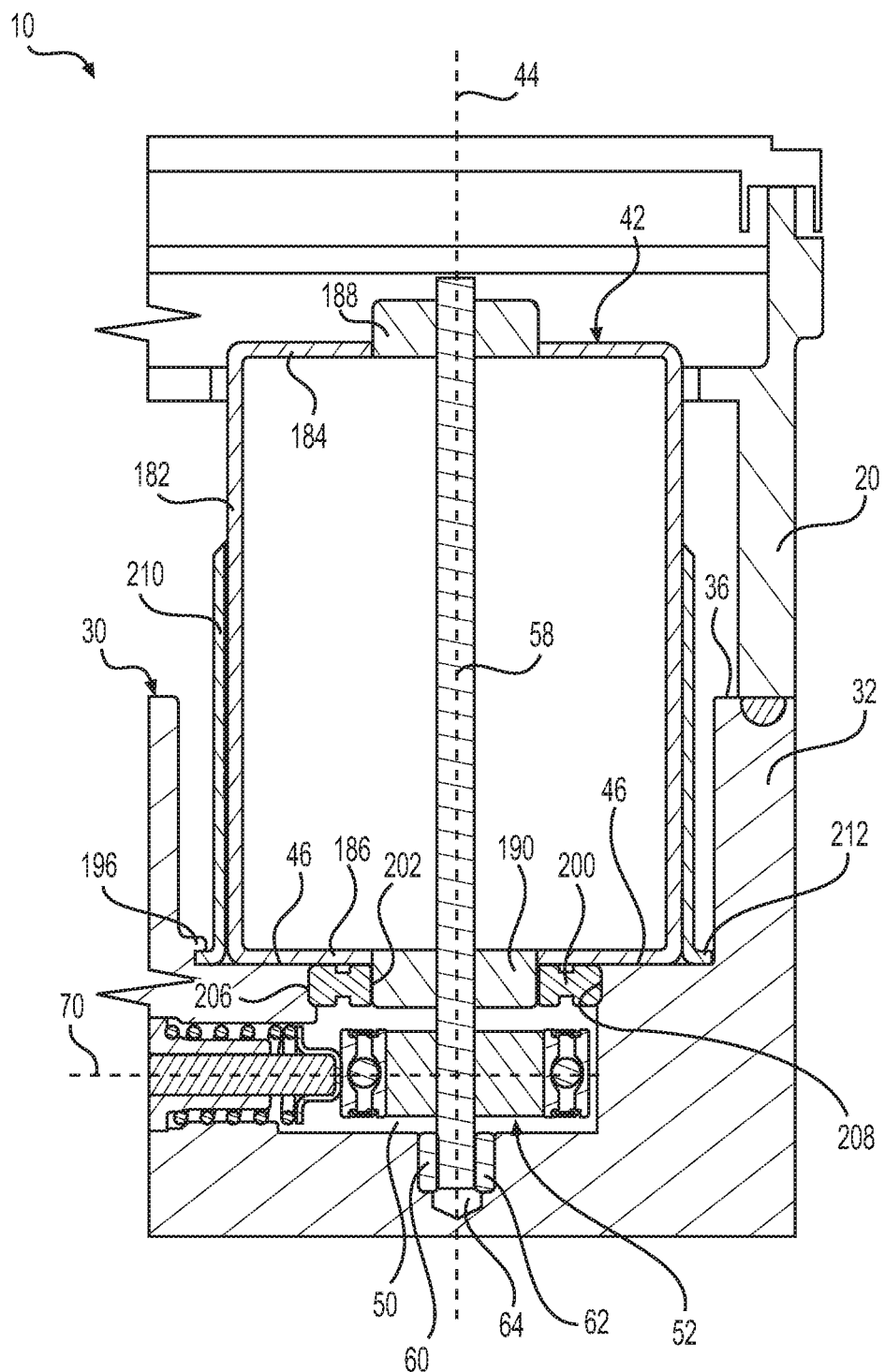
FIG. 5B is an assembled cross-sectional view of the motor assembly of FIG. 5A within a hydraulic control unit according to an aspect of the present disclosure.

As shown in cross-section on FIGS. 4 and 5B, the HCU block 32 defines a bushing chamber 60 having a generally cylindrical shape extending about the motor axis 44 axially beyond eccentric chamber 50, with the bushing chamber 60 holding a pilot bushing 62 for supporting the motor shaft 58 on the motor axis 44. The HCU block 32 further defines a shaft bore 64 extending axially along the motor axis 44 beyond the bushing chamber 60 away from the flat mating face 36 for receiving a portion of the motor shaft 58 extending axially beyond the pilot bushing 62. The shaft bore 64 has a radial width less than that of the bushing chamber 60, preventing the pilot bushing 62 from dropping into the shaft bore 64.

The HCU block 32 also defines a pump bore 66 containing a piston pump 68 of the hydraulic control unit 30. The pump bore 66 extends transversely from one of the side faces 34 along a pump axis 70 intersecting the eccentric chamber 50. The pump bore 66 includes a plurality of bore sections 72, 74, 76, 78, each having a cylindrical shape with progressively larger radius moving axially outwardly from the eccentric chamber 50.

In the example embodiments shown in FIGS. 1, 3A-3B, and 4, the hydraulic control unit 30 includes a single piston pump 68. In the example embodiment shown in FIG. 2, the hydraulic control unit 30 includes two separate piston pumps 68, each driven by a shared rotating eccentric 52. The piston pumps 68 may be used to supply fluid to separate circuits, as shown in the schematic diagram of FIG. 13. Alternatively or additionally, multiple piston pumps 68 may supply fluid to a common fluid conduit to provide a higher flow rate than a single piston pump 68 is able to supply.

Figure 8:
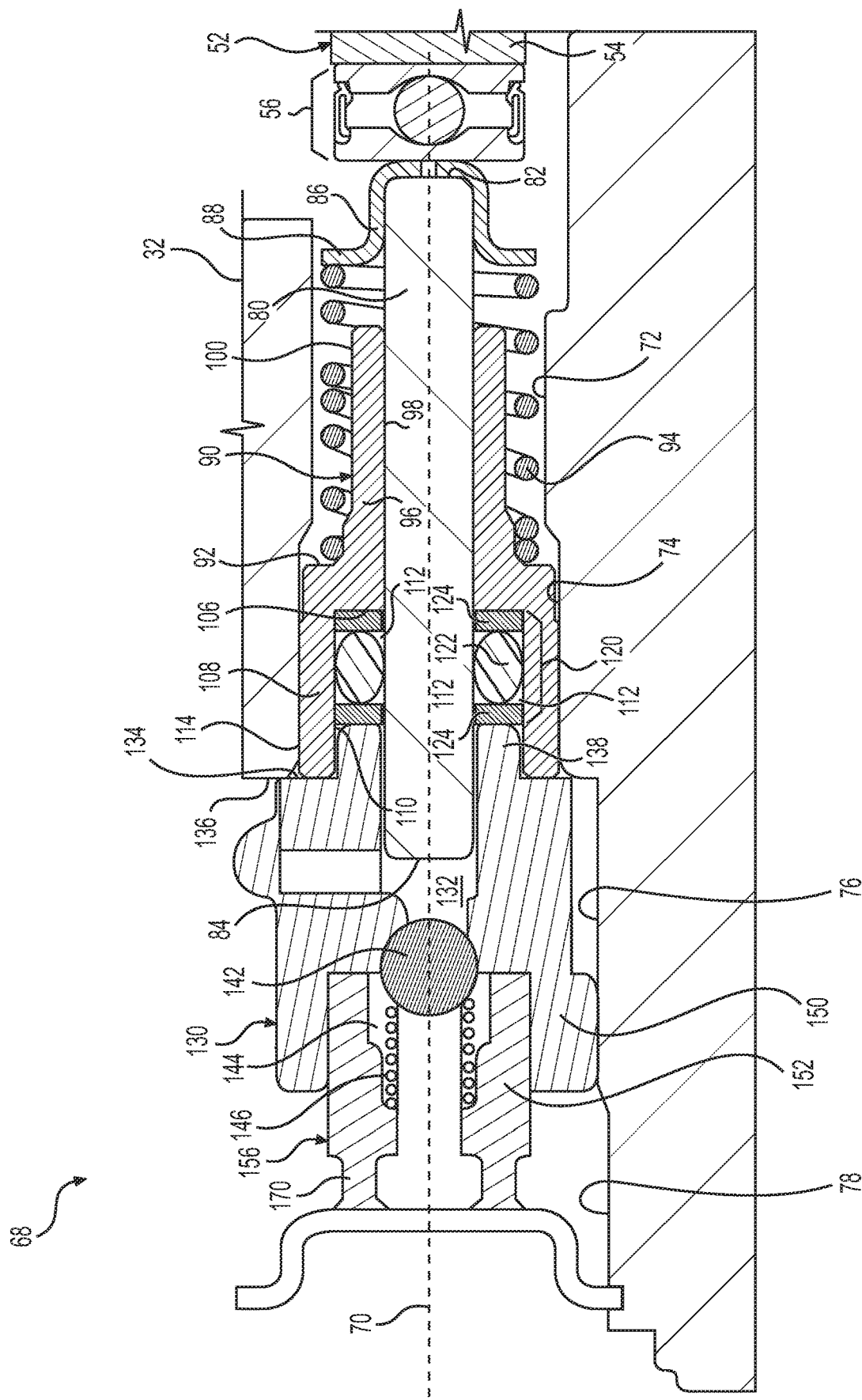
FIG. 8 is a cross-sectional view of a piston pump for a hydraulic control unit according to an aspect of the present disclosure.
Figure 9:
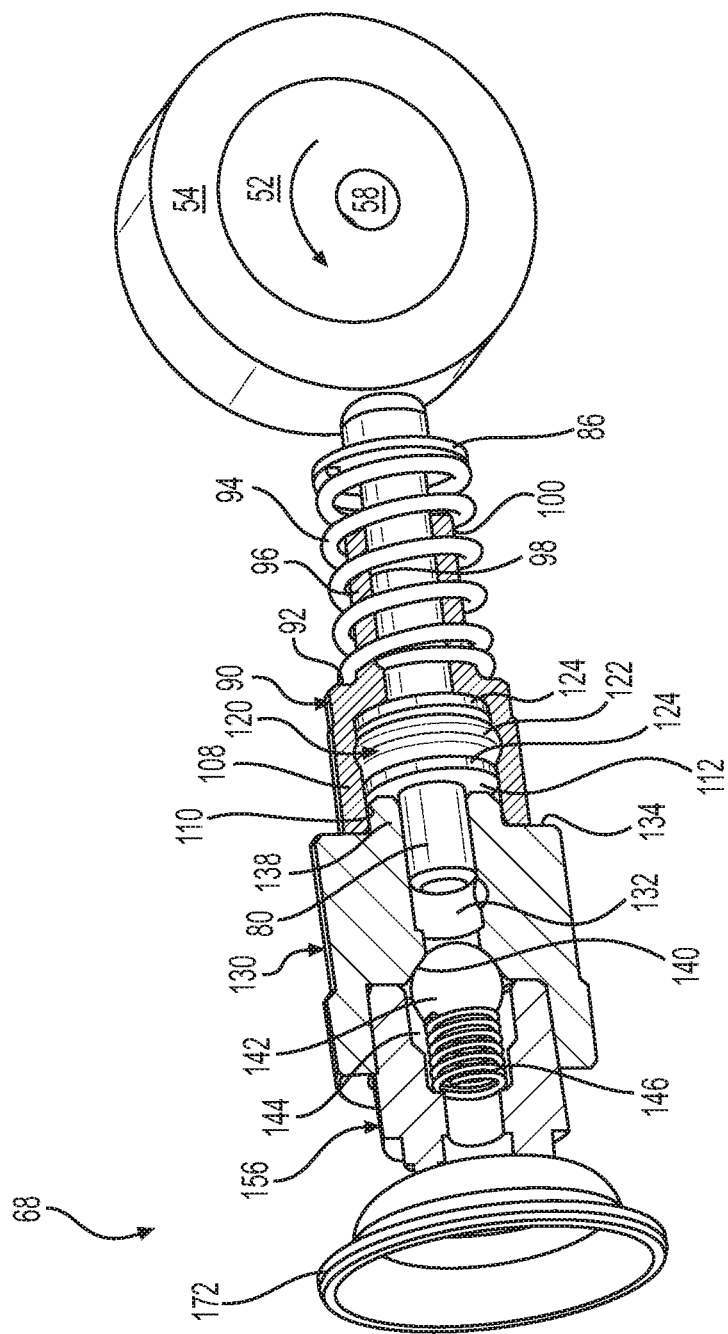
FIG. 9 is an isolated perspective view of the piston pump according to an aspect of the present disclosure.

As best shown in FIGS. 8-9, the piston pump 68 includes a piston rod 80 of metal having a generally cylindrical shape extending along the pump axis 70 between a first end 82 and a second end 84 with a smooth exterior surface extending substantially the entire length between the first end 82 and the second end 84. The ends 82, 84 define terminal surfaces of the piston rod 80, which extend transverse to the pump axis 70. In other words, the piston rod 80 has a smooth cylindrical side wall without any grooves, pits, or protrusions. The piston rod 80 may include rounded or chamfered corners at each of the ends 82, 84, as shown in FIG. 8. The piston rod 80 may, therefore, be easily and/or inexpensively manufactured. Such piston rods 80 may be manufactured, for example, from segments of a wire coil, similarly to needle rollers of a needle bearing. An end cap 86 of drawn metal, such as sheet steel, is press fit around the first end 82 of the piston rod 80 adjacent the rotating eccentric 52. The end cap 86 includes a flange portion 88 extending annularly outwardly from the piston rod 80 and axially spaced from the first end 82 of the piston rod 80. The end cap 86 may be secured to the piston rod 80 by other means such as, for example, by welding or by crimping. The end cap 86 is therefore fixed to move axially with the piston rod 80 through the pump bore 66.

As best shown in FIG. 8, a piston guide 90 is disposed in the pump bore 66 about the piston rod 80 and defines a first shoulder 92 extending annularly radially outwardly toward the HCU block 32 and facing toward the eccentric chamber 50. A return spring 94 is disposed about the piston guide 90 and extends between the first shoulder 92 and the flange portion 88 of the end cap 86 for biasing the piston rod 80 axially toward the rotating eccentric 52. The return spring 94, therefore, keeps the piston rod 80 in continuous contact with the rotating eccentric 52 as the piston rod 80 reciprocates along the pump axis 70.

The piston guide 90 includes a first tubular portion 96 with a first inner surface 98 having a cylindrical shape receiving the piston rod 80 and allowing the piston rod 80 to translate freely only in an axial direction. In other words, the first tubular portion 96 allows the piston rod 80 to reciprocate axially, while restricting it from moving or tilting in other directions. The first tubular portion 96, therefore, provides the "guiding" function for the piston rod 80. The first tubular portion 96 has a first outer surface 100 with a generally cylindrical shape with the return spring 94 disposed thereabout, and with the first outer surface 100 spaced apart from the HCU block 32 with the return spring 94 extending therebetween.

As also shown in FIG. 8, the piston guide 90 includes a base surface 106 extending annularly and radially outwardly from the first inner surface 98 and facing away from the eccentric chamber 50. A second tubular portion 108 extends axially from the base surface 106 opposite the first tubular portion 96 and defines a second inner surface 110 with a cylindrical shape radially spaced apart from the piston rod 80 to define a first throat 112. The second tubular portion 108 also includes a second outer surface 114 having a generally cylindrical shape engaging the HCU block 32 to hold the piston guide 90 in a fixed position within the pump bore 66. In other words, the second outer surface 114 of the piston guide 90 tightly engages the second bore section 74 of the HCU block 32, aligning the piston guide 90 with the pump axis 70.

A gland seal 120 is disposed in the first throat 112 of the piston guide 90. The gland seal 120 includes a first O-ring 122 sealingly surrounding the piston rod 80 to prevent leakage thereabout as the piston rod 80 moves axially therethrough for pumping the fluid. The gland seal 120 also includes an optional backup washer 124 disposed on either side of the first O-ring 122 and adjacent thereto. Each of the optional backup washers 124 have a generally flat shape extending annularly about the piston rod 80 and radially outwardly to the second inner surface 110 of the piston guide 90. The depth of the first throat 112 may be adjusted according to the number of optional backup washers 124 employed.

The piston pump 68 also includes an outlet valve housing 130 disposed in the pump bore 66. The outlet valve housing 130 has a generally tubular shape defining a pumping chamber 132 for receiving the piston rod 80 and having a volume that varies as the piston rod 80 moves axially within the pumping chamber 132. As shown in FIG. 8, the outlet valve housing 130 defines an annular ledge 134 extending radially outwardly and facing toward the eccentric chamber 50 to engage a second shoulder 136 of the HCU block 32 between two adjacent ones of the bore sections 72, 74, 76, 78. The annular ledge 134, therefore, holds the outlet valve housing 130 at a fixed axial position within the pump bore 66. The outlet valve housing 130 also includes a tubular protrusion 138 extending axially from the annular ledge 134 toward the eccentric chamber 50 and into the first throat 112 of the piston guide 90. The tubular protrusion 138 holds the gland seal 120 at a fixed position in the first throat 112 and prevents the gland seal 120 from being displaced by action of the piston rod 80. This provides for an improved seal and protects the gland seal 120 from premature wear that may be caused if it were free to move axially. In some embodiments, the outlet valve housing 130 may include two or more tubular protrusions 138.

The outlet valve housing 130 also defines an outlet valve seat 140 extending annularly about the pump axis 70 for receiving an outlet closing member 142 separating the pumping chamber 132 from an outlet fluid chamber 144. The outlet closing member 142 in the example embodiment is a metal ball. However, the outlet closing member may be conical, frusto-conical, or another shape, and may be made of any suitable material. The outlet closing member 142 is biased into sealing engagement with the outlet valve seat 140 by an outlet valve spring 146 to provide a closing force and to prevent fluid from communicating from the outlet fluid chamber 144 into the pumping chamber 132. The outlet valve spring 146 is illustrated as a coil spring, however other types of springs may be used including, for example, a flexible beam or bar, or a spring formed as a dome or a wave. The outlet closing member 142 is movable off of the outlet valve seat 140 by fluid pressure in opposition to the closing force from the outlet valve spring 146 to allow fluid to communicate out of the pumping chamber 132 and into the outlet fluid chamber 144. The outlet valve housing 130 also includes an annular wall 150 extending axially beyond the outlet valve seat 140 and away from the eccentric chamber 50 to define a second throat 152 receiving an outlet spring retainer 156.

The outlet spring retainer 156 is shown in detail on FIG. 10 and has a generally tubular shape around a central bore 158 and includes a first segment 160 adjacent the outlet valve housing 130 for receiving the outlet closing member 142. The outlet spring retainer 156 also includes a second segment 162 axially spaced away from the outlet valve housing 130 for holding the outlet valve spring 146. The outlet spring retainer 156 also includes a third segment 164 axially spaced away from the outlet valve housing 130 beyond the second segment 162, with the segments 160, 162, 164 being progressively narrower away from the outlet valve housing 13. The outlet spring retainer 156 defines an internal ledge 166 between the second segment 162 and third segment 164 and facing the eccentric chamber 50 for engaging the outlet valve spring 146 opposite the outlet closing member 142.

The outlet spring retainer 156 also includes a plurality of tapered posts 170 extending axially away from the eccentric chamber 50 to engage an outlet cap 172 for holding the piston pump 68 in the pump bore 66 of the HCU block 32. The tapered posts 170 are configured to deform by a predetermined amount during assembly to maintain the piston pump 68 at a fixed positon in the pump bore 66 and to prevent rattle. In other words, the deformation of the tapered posts 170 maintains a compressive force between several components of the piston pump 68, which maintains those components at fixed locations within the HCU block 32. As shown in FIG. 10, the HCU block 32 defines a first staked lip 174 within the pump bore 66 for securing the outlet cap 172 therein. The material of the HCU block 32 is formed into the first staked lip 174 at one or more locations to secure the outlet cap 172 and the other parts of the piston pump 68 within the pump bore 66.

An inlet check valve 230 is disposed in an inlet valve bore 231 of the HCU block 32 to allow fluid flow into the piston pump 68 while preventing fluid flow in a reverse direction. The inlet check valve 230 is detailed in FIG. 7, and includes an inlet valve housing 232, which is generally cylindrical with a hollow bore extending axially therethrough. The inlet valve housing 232 defines an inlet valve seat 234 for sealingly receiving an inlet closing member 236, which is preferably a metal ball. However, the outlet closing member may be another shape such as conical, or frusto-conical, and may be made of any suitable material. The inlet check valve 230 also includes an inlet valve spring 238 configured to bias the inlet closing member 236 into sealing engagement with the inlet valve seat 234. The inlet valve spring 238 is illustrated as a coil spring, however other types of springs may be used including, for example, a flexible beam or bar, or a spring formed as a dome or a wave. The inlet closing member 236 is movable off the inlet valve seat 234 by fluid pressure in opposition to the closing force from the inlet valve spring 238 to allow fluid to communicate into of the pumping chamber 132 of the piston pump 68.

An accumulator assembly 240 is associated with each of the piston pumps 68 and functions as a reservoir for excess fluid as a source of stored energy to maintain fluid pressure. Each of the accumulator assemblies 240 is disposed within an associated accumulator bore 241 having a generally cylindrical shape extending into the HCU block 32 through and generally transverse to the bottom face 39 and transverse to the pump axis 70. As detailed on FIG. 7, each of the accumulator assemblies 240 includes an accumulator piston 242 having a generally cylindrical shape with a ring seal 244, such as an O-ring, disposed in a circumferential groove 246 of the accumulator piston for sealing with the accumulator bore 241 as the accumulator piston 242 moves axially therein. A coil spring 248 biases the piston 242 away from an accumulator cap 250, which is press-fit into the accumulator bore 241 adjacent the bottom face 39 of the HCU block 32. The accumulator cap 250 may also be secured within the HCU block 32 by other means such as staking, welding, by an adhesive, and/or with a threaded connection. As best shown in FIG. 1, the inlet valve bore 231 is coaxial with the accumulator bore 241, with the inlet valve bore 231 having a smaller diameter than the accumulator bore 241 and extending axially therefrom away from the bottom face 39 of the HCU block 32.

As detailed in the cross-sectional views of FIGS. 4 and 5B, the electric motor 42 includes a motor housing 180 having a side wall 182 with a generally cylindrical shape extending along the motor axis 44 between a base end 184 and a power end 186. Each of the base end 184 and the power end 186 extend parallel to one another and perpendicular to the motor axis 44. The base end 184 surrounds a base bushing 188 for rotatably supporting the motor shaft 58. The base bushing 188 may be a plain bearing of one or more materials such as bronze or nylon. Alternatively, the base bushing 188 may be a bearing including a plurality of roller elements. Similarly, the power end 186 surrounds an output bushing 190 for rotatably supporting the motor shaft 58. The output bushing 190 may be a plain bearing made of one or more materials such as bronze or nylon. Alternatively, the output bushing 190 may be a bearing including a plurality of roller elements. The output bushing 190 may have a generally cylindrical shape which protrudes axially beyond the power end 186 away from the base end 184.

The hydraulic control unit 30 may also include two or more solenoid valves 220, 222 including an apply valve 220 and a release valve 222, each having a corresponding valve stem 224 protruding from the mating face 36 of the HCU block 32 for being activated by a corresponding magnetic coil in the electronic control unit 20.

The hydraulic control unit 30 also includes a pump sump 260 having a sump bore 262 with a stepped cylindrical shape extending into the HCU block 32 for holding any fluid that weeps beyond the gland seal 120 of the piston pumps 68. As shown in FIGS. 1 and 2, the sump bore 262 extends generally transverse to the bottom face 39 of the HCU block 32 to intersect the eccentric chamber 50. As shown in FIG. 11, the pump sump 260 includes a sump cover 264 press fit within the sump bore 262 adjacent the bottom face 39 of the HCU block 32. The sump cover 264 may also be secured within the HCU block 32 by other means such as staking, welding, by an adhesive, and/or with a threaded connection. The sump cover 264 and the outlet cap 172 enclosing the pump bore 66 may each be identical to one another. In other words, parts having a common construction, which may be a stamped and drawn piece of sheet metal, may be used for both the sump cover 264 and the outlet cap 172.

In one embodiment of the hydraulic control unit, and as shown in FIG. 4, a mounting plate 192 is secured to the power end 186 of the motor housing 180 with fasteners 194. The fasteners 194 are preferably screws, although bolts, rivets, clips, or any other suitable fastener may be used. The mounting plate 192 is generally flat for engaging the floor 46 of the motor bore 40. The HCU block 32 defines one or more second staked lips 196 within the motor bore 40 with the mounting plate 192 secured between the one or more second staked lips 196 and the floor 46 of the motor bore 40 and thereby securely holding the electric motor 42 within the motor bore 40. In other words, the HCU block 32 may be deformed into the one or more second staked lips 196 to securely hold the mounting plate 192 and the electric motor 42 in the motor bore 40.

In another embodiment, and as shown in FIGS. 5A-5B, a spacer ring 200 having a ring shape is used for locating the electric motor 42 centrally within the motor bore 40 and with the motor shaft 58 centered along the motor axis 44. The spacer ring 200 includes a radially innermost inner surface 202 tightly surrounding and engaging the output bushing 190 of the electric motor 42. The spacer ring 200 also includes a discontinuous outer surface 206 configured to engage an annular inner wall 208 of the HCU block 32, which extends parallel to the motor axis 44 beyond the floor 46 and toward the eccentric chamber 50. The spacer ring 200 is preferably made of rigid but resilient material, such as plastic. As shown in FIG. 6, the spacer ring 200 may include a plurality of tabs 204, carefully sized to control the magnitude of a press fit with the annular inner wall 208, with each of the tabs 204 having a wedge shape equidistantly spaced about the spacer ring 200 and extending radially outwardly to the outer surface 206.

As best shown in the embodiment of FIG. 5B, the electric motor 42 may include a motor sleeve 210 having a generally cylindrical shape surrounding the side wall 182 of the motor housing 180. The motor sleeve 210 includes an annular ring 212 extending radially outwardly adjacent the power end 186 of the motor housing 180 for engaging the floor 46 of the motor bore 40. The motor sleeve 210 is preferably secured to the motor housing 180 by resistance or laser welding. The HCU block 32 defines one or more second staked lips 196 within the motor bore 40 with the annular ring 212 of the motor sleeve 210 secured between one or more second staked lips 196 and the floor 46 of the motor bore 40 and thereby securely holding the electric motor 42 within the motor bore 40.

Figure 12:
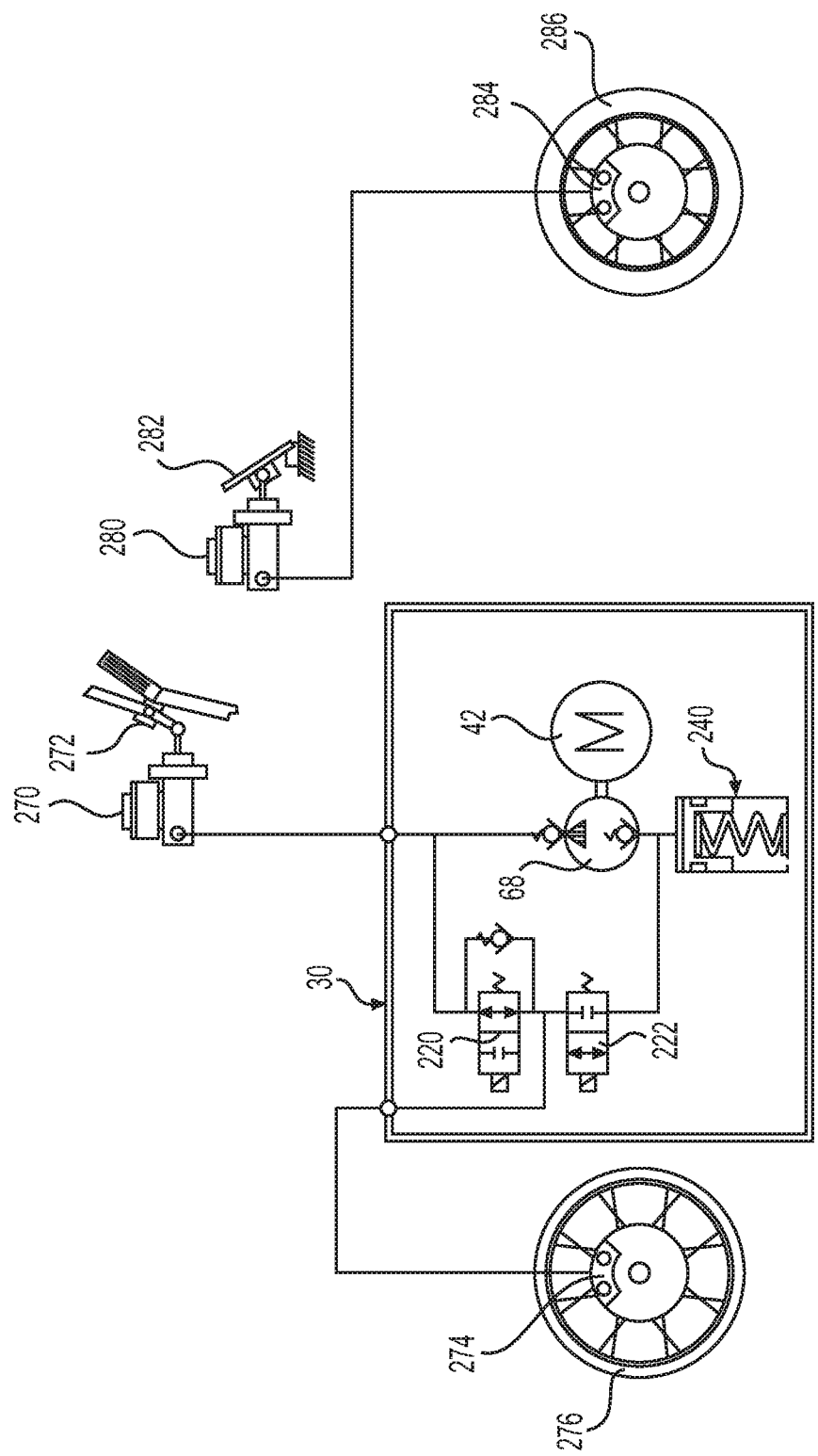
FIG. 12 is a schematic diagram of a hydraulic brake system for a motorcycle including a hydraulic control unit regulating a single brake circuit.

FIG. 12 is a schematic diagram showing a version of the hydraulic control unit 30 in a motorcycle application, where the hydraulic control unit 30 is configured to control fluid in a single brake circuit. The hydraulic control unit 30 may be used in a similar configuration in other types of vehicles having any number of wheels or other means of locomotion, such as treads, tracks, or legs. A first brake circuit includes a first master brake cylinder 270 coupled to a first brake input 272, which is a handlebar-mounted brake leaver in the example embodiment. The first master brake cylinder 270 provides fluid pressure to actuate a first brake actuator 274, in order to provide braking force to a first wheel 276. The apply solenoid valve 220, the release solenoid valve 222, and the piston pump 68 each function to regulate and/or to boost the flow of brake fluid to the first brake actuator 274. A second, independent brake circuit includes a second master brake cylinder 280 coupled to a second brake input 282, which is a brake pedal in the example embodiment. The second master brake cylinder 280 provides fluid pressure to actuate a second brake actuator 284, in order to provide braking force to a second wheel 286.

Figure 13:
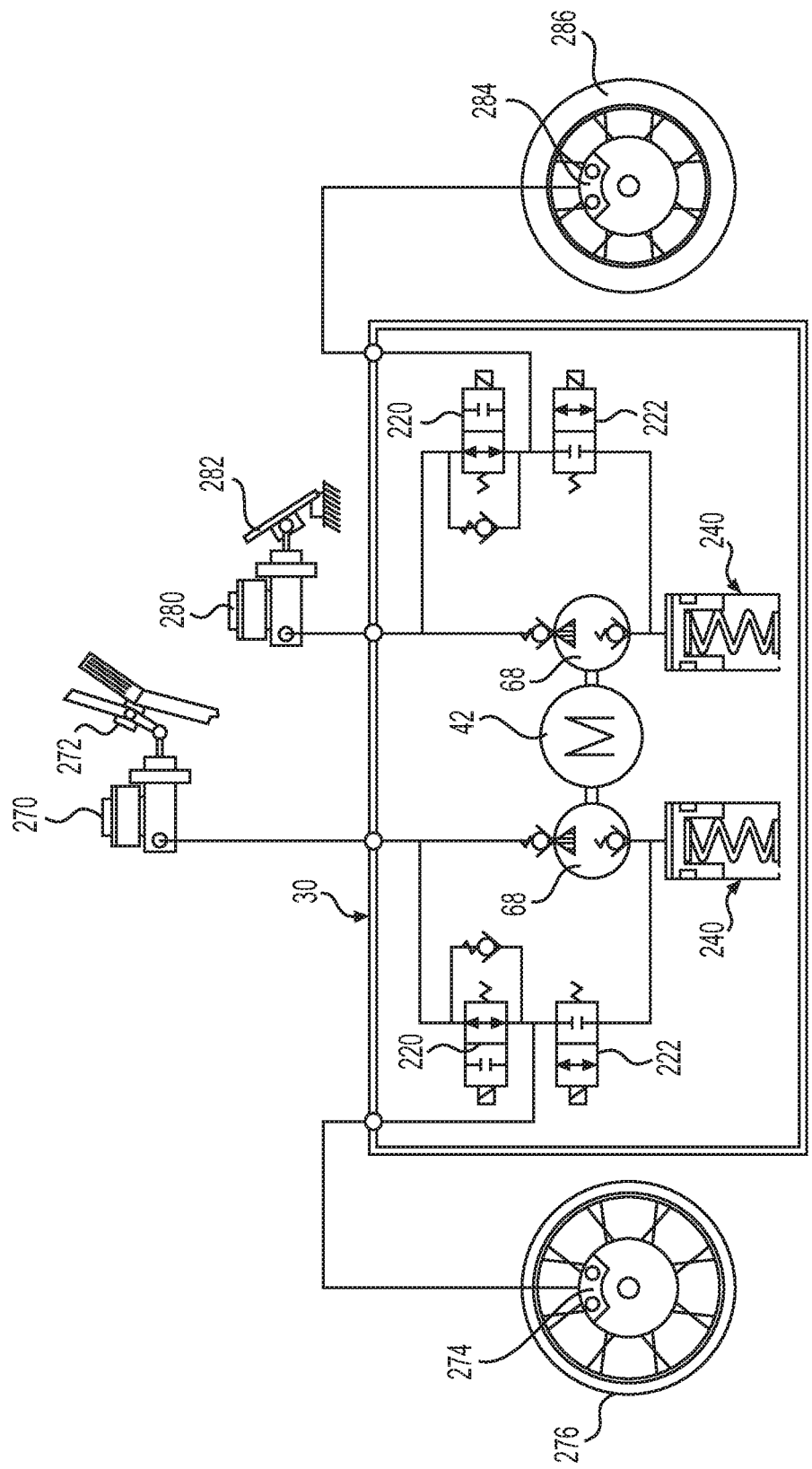
FIG. 13 is a schematic diagram of a hydraulic brake system for a motorcycle including a hydraulic control unit regulating two separate brake circuits.

FIG. 13 is a schematic diagram showing a version of the hydraulic control unit 30 with a motorcycle application with two independent brake circuits, each having an associated piston pump 68. The hydraulic control unit 30 may be used in a similar configuration in other types of vehicles having any number of wheels or other means of locomotion, such as treads, tracks, or legs. Similarly to the embodiment of FIG. 12, the first brake circuit includes a first master brake cylinder 270 coupled to a first brake input 272, which is a handlebar-mounted brake leaver. The first master brake cylinder 270 provides fluid pressure to actuate the first brake actuator 274 to provide braking force to the first wheel 276. The first brake circuit has associated solenoid valves 220, 222, and a piston pump 68 to regulate and/or to boost the flow of brake fluid to the first brake actuator 274. The second, independent, brake circuit includes the second master brake cylinder 280 coupled to the second brake input 282. The second master brake cylinder 280 provides fluid pressure to actuate the second brake actuator 284, in order to provide braking force to the second wheel 286. The second brake circuit has associated solenoid valves 220, 222, and a piston pump 68 to regulate and/or to boost the flow of brake fluid to the second brake actuator 284. in the embodiment of FIG. 13. In other words, the brake system in the embodiment of FIG. 13 includes two brake circuits that share a common hydraulic control unit 30, which independently regulates and/or boosts fluid flow to each of two different brake actuators. In this way, each wheel can provide independent automated brake modulation for traction control, antilock brake system (ABS), or for other purposes.

Figure 14:
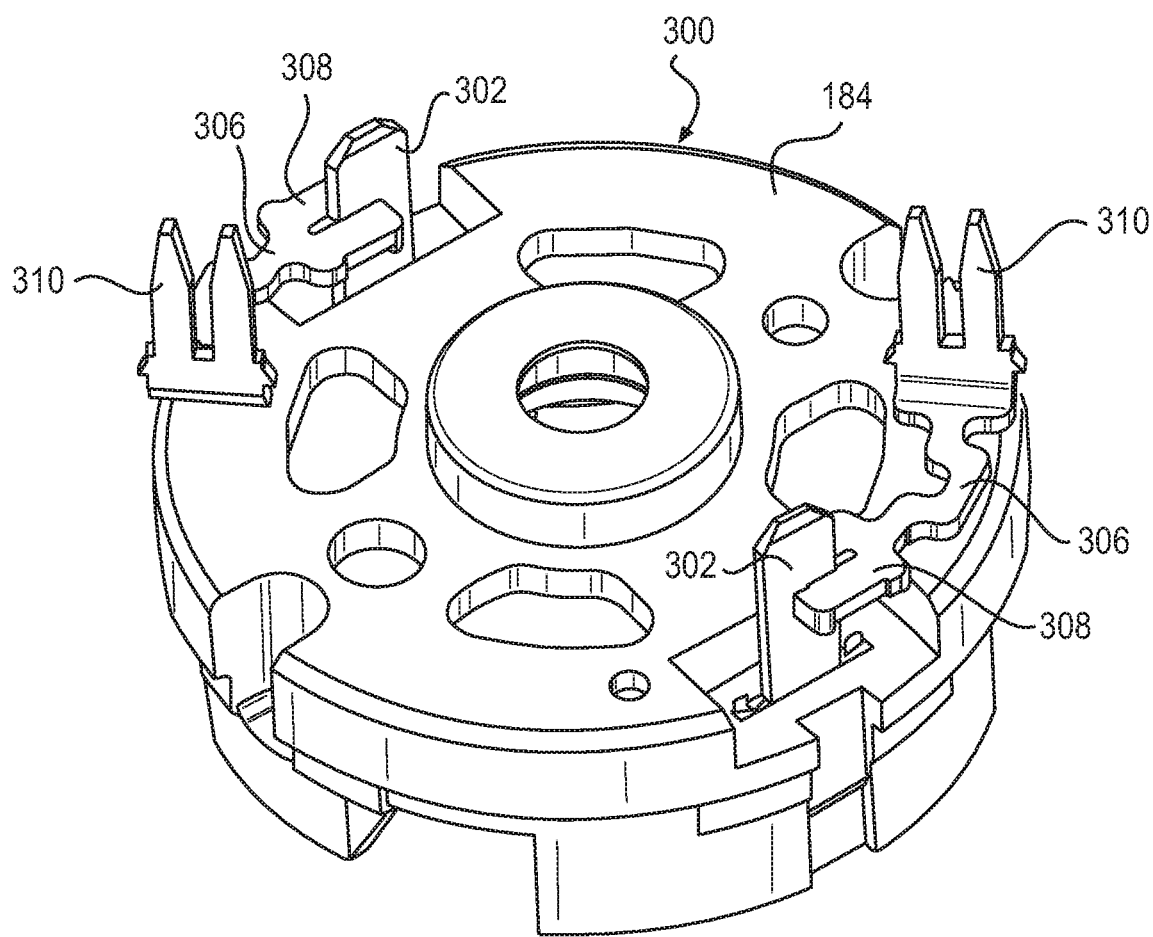
FIG. 14 is a profile view of a housing cap for an electric motor of an electro-hydraulic control unit according to an aspect of the disclosure.
Figure 16:
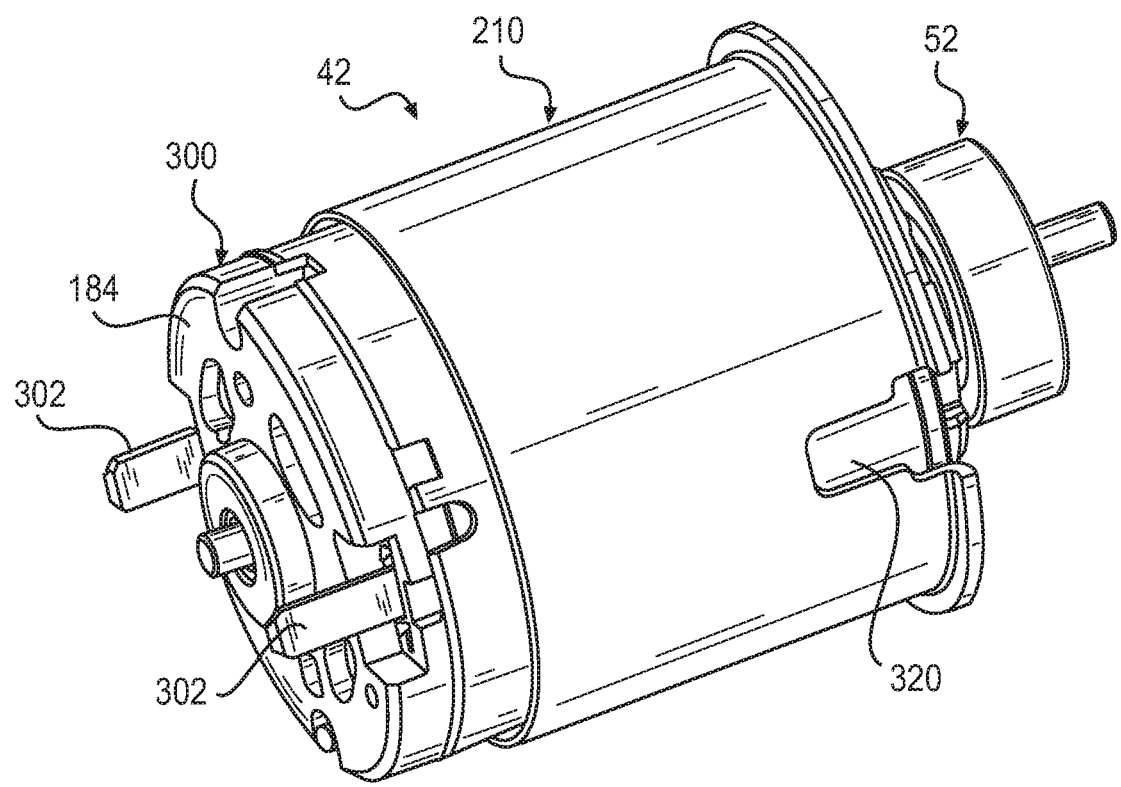
FIG. 16 is a profile view of an electric motor according to an aspect of the disclosure.

Since the electric motor 42 will create some level of vibrations and since changes in temperature can affect the overall length of the electric motor 42, it is critical to use a flexible type of terminal to make an electrical connection between the electric motor 42 and the ECU 20. FIGS. 14 and 16 show an embodiment where the electric motor 42 includes a housing cap 300 that defines the base end 184 opposite the rotating eccentric 52. Terminal tabs 302 of metal extend through the housing cap 300 for conducting electrical current to drive the electric motor 42. The terminal tabs 302 may be shaped as shown in the FIGS., although other configurations are possible, such as round pins, for example.

Figure 15:
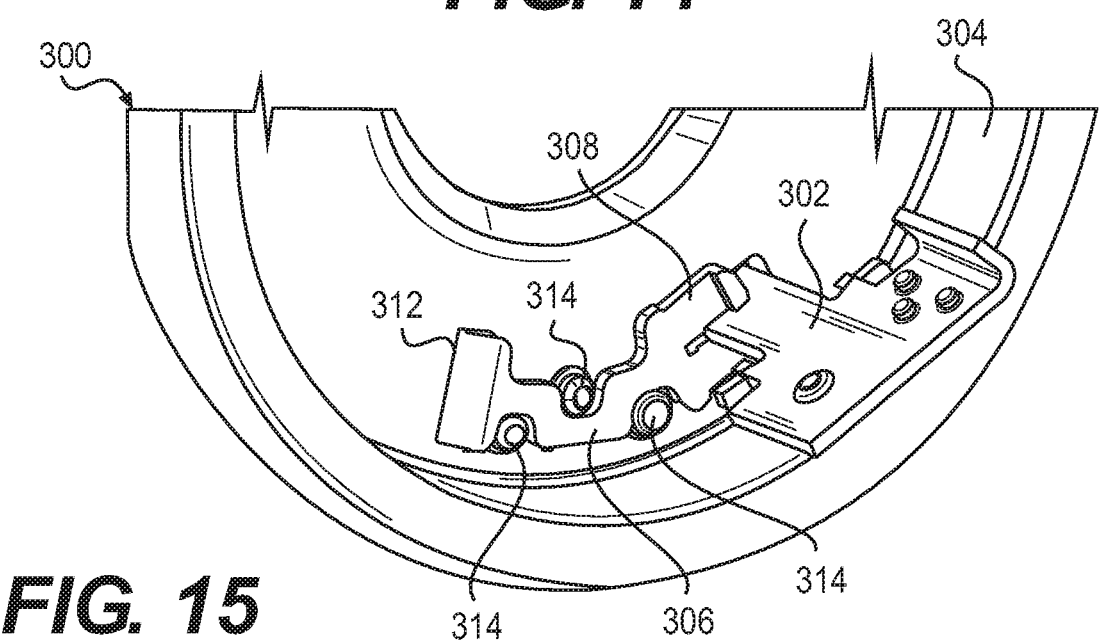
FIG. 15 is a profile view of an enlarged portion of a housing cap for an electric motor of an electro-hydraulic control unit according to an aspect of the disclosure.

FIG. 15 shows a cylindrical recess 304 in the housing of the ECU 20 for receiving the housing cap 300 of the electric motor 42. An intermediate conductor 306 of electrically conductive material includes a first connector 308 for engaging a corresponding one of the terminal tabs 302. The first connectors 308 may be formed as a fork that pinches two opposite sides of the terminal tabs 302, as shown although other arrangements are possible. A second connector 310 is formed on the end of the intermediate conductors 306 opposite the first connectors 308. The second connectors 310 extend through corresponding slots 312 in the housing of the ECU 20 and make electrical contact with a circuit board or other structure within the ECU 20 to provide electrical power to the electric motor 42. The intermediate conductors 306 may be press-fit compliant pins that are first pressed into a slot in the ECU housing from below and then press fit into the circuit board to make the connection. Locating pins 314 on the bottom surface may be used to aid in assembly.

The intermediate conductors 306 are designed to press fit the terminal tabs 302 of the electric motor 42 upon insertion and remain flexible so that there is no relative motion between the two devices. If the ECU 20 is not required to be separately serviced, there is no need to further confine the motion of the intermediate conductors 306. However, if the ECU 20 is required to be separately serviceable, then due to the force of the press fit terminals, the travel of the flexible intermediate conductors 306 may need to be limited by incorporating a travel stop feature (not shown) in the mounting locating pins.

FIG. 16 also illustrates an embodiment of the motor sleeve 210 that includes an error-proofing feature in the form of a notch 320. A laser beam or vision camera may then be employed in the assembly fixtures to pre-align the electric motor 42 such that the positive and negative terminals 302 are lined up on the correct side for controlling direction of motor shaft 60 rotation. Further precision alignment of the electric motor terminals 302 may then be accomplished by incorporating a pin or other location device in the electric motor assembly tools (not shown) that mate up with a corresponding hole or slot in the base end 184 prior staking the electric motor 42 in place.

Figures 17A, 17B:
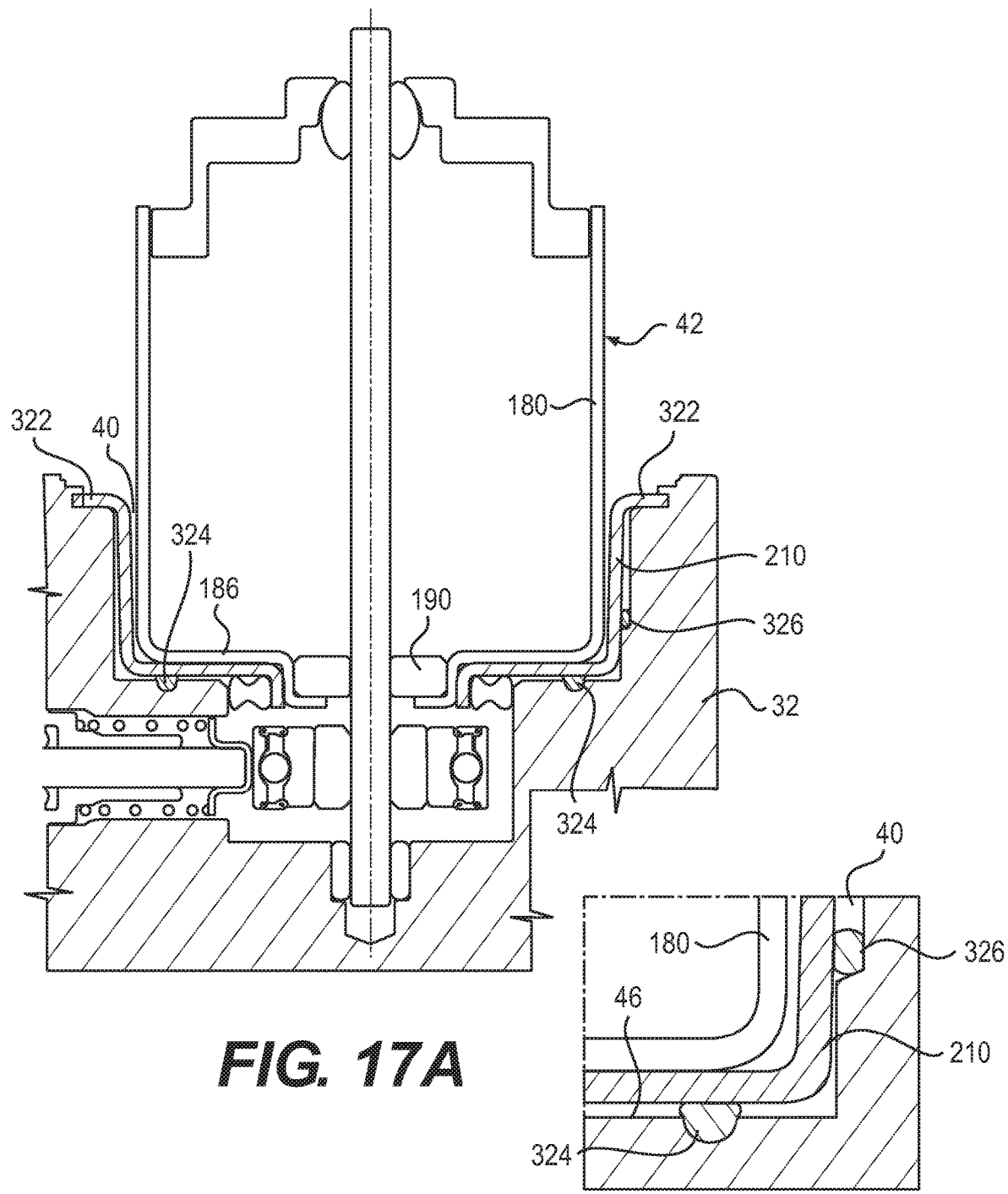
FIG. 17A is a cross-sectional view of an electric motor within an electro-hydraulic control unit according to an aspect of the disclosure.
FIG. 17B is an enlarged portion of the cross-sectional view of FIG. 17A.
Figure 18:
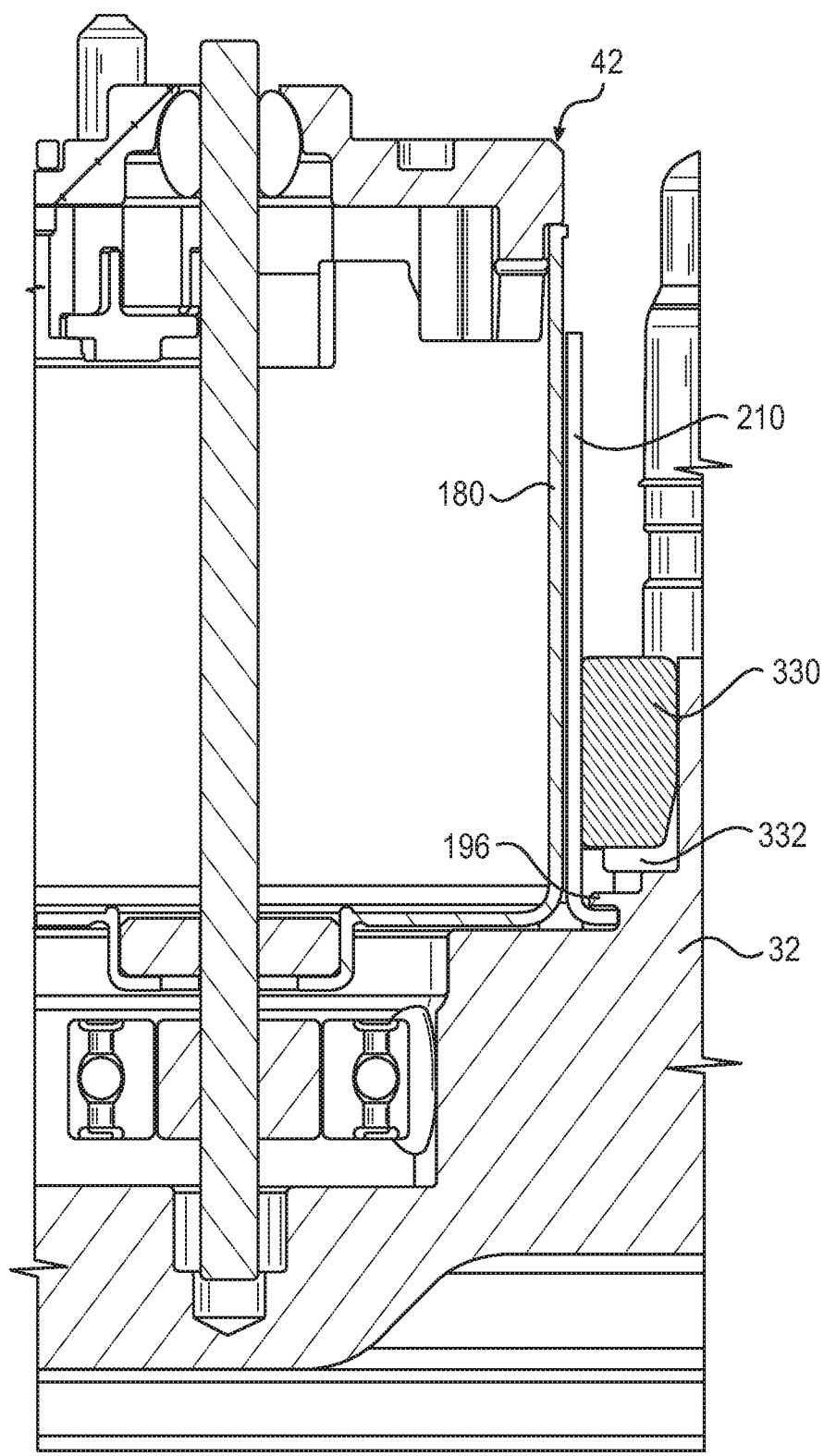
FIG. 18 is a cross-sectional view of an electric motor within an electro-hydraulic control unit according to an aspect of the disclosure.

In the embodiment shown in FIG. 17A, the motor sleeve 210 is formed as a deep draw workpiece, which may be press fit around the output bushing 190 of the electric motor 42. The motor sleeve 210 may be further secured to the electric motor 42, for example by welding or using one or more fasteners. The motor sleeve 210 extends up to the surface of the HCU block 32, where it turns radially as an outward portion 322. That outward portion 322 can then be secured in place by a staking" operation that deforms a part of the HCU block 32 over the outward portion, thereby securing the electric motor 42 within the motor bore 40. This makes is much easier for machining and staking of the outward portion 322. A second function of the sleeve 210 is to act as a magnetic flux ring that adds to the flux carrying capacity of the motor case side walls 182 to improve performance and efficiency of the electric motor 42.

In addition, and as best shown in the enlarged view of FIG. 17B, the electric motor 42 may rest and compress a cushion 324, 326 of damping material, such as rubber, to minimize noise and/or vibration transmission and to provide for quieter operation of the hydraulic control unit 30. The cushion 324, 326 may include a second O-ring 324 disposed between the bottom of the motor sleeve 210 and the floor 46 of the motor bore 40. Additionally, or alternatively, the cushion 324, 326 may include a third O-ring 326 extending between a side of the motor sleeve 210 and a cylindrical side wall of the motor bore 40.

Figure 19:
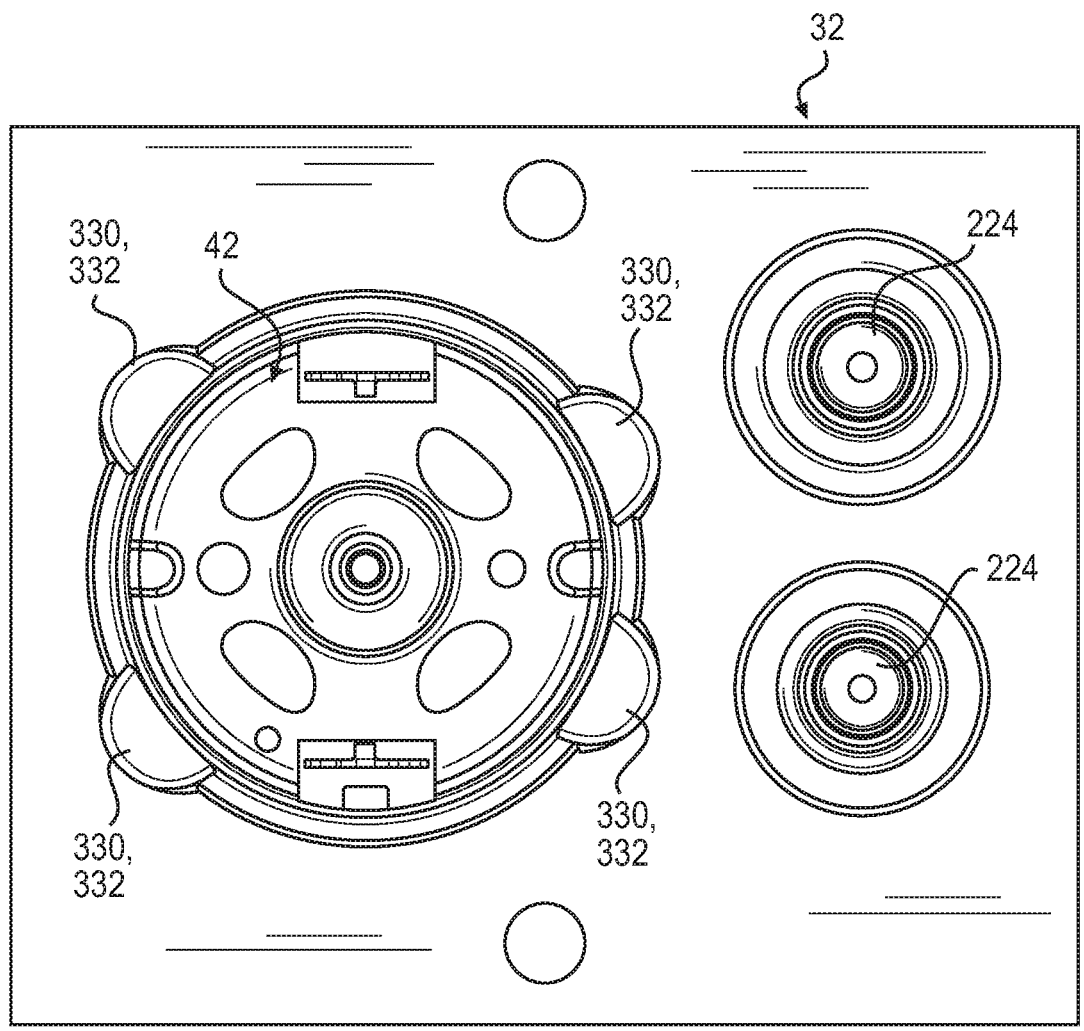
FIG. 19 is a top view of an electric motor within an electro-hydraulic control unit according to an aspect of the disclosure.
Figure 20:
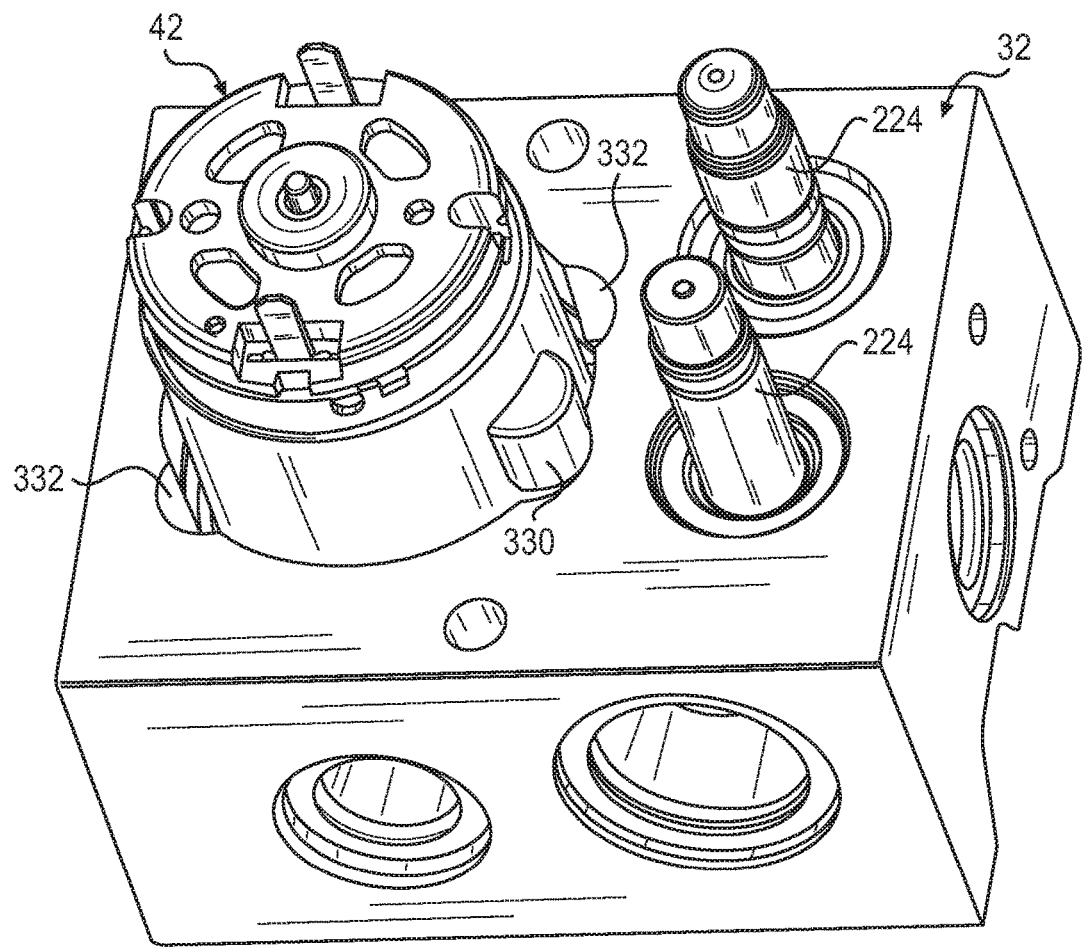
FIG. 20 is a profile view of an electric motor within an electro-hydraulic control unit according to an aspect of the disclosure.
Figure 21:
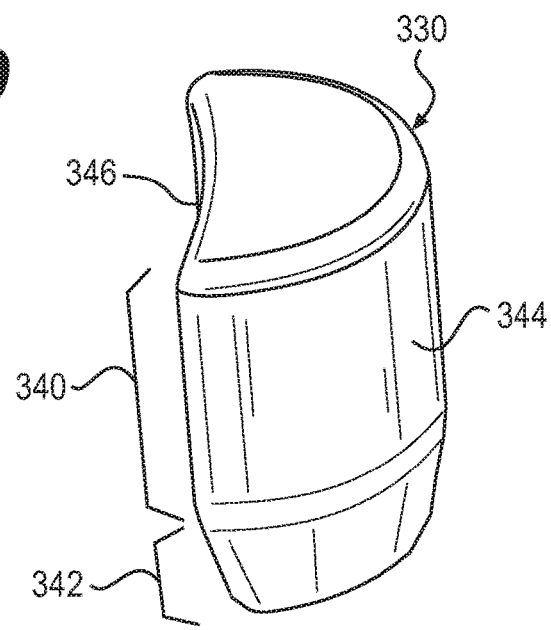
FIG. 21 is a profile view of a rubber damper for an electro-hydraulic control unit according to an aspect of the disclosure.

In some embodiments, the side wall of the motor bore 40 may define one or more recesses 332 extending parallel to the motor axis 44. The recesses 332 may provide access for tooling to form the second staked lips 196 securing the motor sleeve 210 and the electric motor 42 within the motor bore 40 of the HCU block 32. In some embodiments, and as shown in FIGS. 19-20, one or more of the recesses 332 may have a tubular shape. As shown in FIGS. 18-21, one or more rubber dampers 330, which may be formed of rubber, foam, or another resilient material, may be disposed within a recess 332 in the side wall of the motor bore 40. In some embodiments, the rubber dampers 330 may have a cross-sectional shape to match a shape of a corresponding one of the recesses 332. For example, the rubber dampers 330 may have a crescent-shape cross-section as shown in FIG. 21. In some embodiments, and as shown in FIG. 19, the side wall of the motor bore 40 defines four recesses 332, with one of the rubber dampers 330 disposed within each of the recesses 332. The rubber dampers 330 are intended to minimize noise and/or vibration transmission between the electric motor 42 and the HCU block 32 and to provide for quieter operation of the hydraulic control unit 30.

One or more of the rubber dampers 330 may have the design shown in FIG. 21, including an upper portion with a generally constant cross-section 340 and a tapered lower portion 342 having a gradually reduced cross-section, which may facilitate installation of the rubber damper 330 into the HCU block 32. As also shown in FIG. 21, the rubber dampers 330 define a convex surface 344 configured conform with a tubular-shaped recess 332 in the side wall of the motor bore 40. The rubber dampers 332 also define a concave surface 346 opposite the convex surface 344 and configured to receive the cylindrical motor sleeve 210, thereby allowing the rubber damper 330 to fit snuggly between the tubular recess 332 in the side wall of the motor bore 40, dampening vibration of the electric motor 42.

The foregoing invention has been described in accordance with the relevant legal standards, thus the description is exemplary rather than limiting in nature. These antecedent recitations should be interpreted to cover any combination in which the inventive novelty exercises its utility. Variations and modifications to the disclosed embodiment may become apparent to those skilled in the art and do come within the scope of the invention. Accordingly, the scope of legal protection afforded this invention can only be determined by studying the following claims.

What is claimed is:

1. A hydraulic control unit comprising:
   an HCU block defining an eccentric chamber containing a rotating eccentric;
   a piston guide including a first tubular portion extending along a pump axis with a first inner surface having a cylindrical shape receiving a piston rod and allowing said piston rod to translate freely only in an axial direction, said first tubular portion having a first outer surface with a generally cylindrical shape with a return spring disposed thereabout,
   said piston guide including a base surface extending annularly and radially outwardly from said first inner surface and facing away from said eccentric chamber, with a second tubular portion extending axially from said base surface opposite said first tubular portion and including a second inner surface having a cylindrical shape and radially spaced apart from said piston rod to define a first throat therebetween; and
   a gland seal disposed in said first throat of said piston guide surrounding said piston rod to prevent leakage thereabout as said piston rod moves axially therethrough; and
   wherein said piston rod has a generally cylindrical shape extending along said pump axis between a first end and a second end, said piston rod having a smooth exterior surface extending substantially the entire length between said first end and said second end.

2. The hydraulic control unit as set forth in claim 1, further comprising: an end cap disposed around said first end of said piston rod and fixed to move axially with said piston rod, and
   wherein said end cap includes a flange portion extending annularly outwardly from said piston rod for engaging said return spring.

3. The hydraulic control unit as set forth in claim 1, further comprising:
   an outlet valve housing defining a pumping chamber for receiving said piston rod, said outlet valve housing defining an annular ledge extending radially outwardly and facing toward said eccentric chamber;
   said outlet valve housing including a tubular protrusion extending axially from said annular ledge toward said eccentric chamber and into said first throat of said piston guide for holding said gland seal at a fixed position in said first throat.

4. The hydraulic control unit as set forth in claim 1, wherein said gland seal includes an O-ring sealingly surrounding said piston rod to prevent leakage thereabout as said piston rod moves axially therethrough; and
   wherein said gland seal also includes a backup washer disposed adjacent said O-ring and having a generally flat shape extending annularly about said piston rod and radially outwardly to said second inner surface of said piston guide.

5. The hydraulic control unit as set forth in claim 4, wherein said gland seal includes two of said backup washers with said O-ring disposed between said two of said backup washers.

6. The hydraulic control unit as set forth in claim 1, further comprising:
   a pump sump including a sump bore having a cylindrical shape extending into said HCU block transverse to said pump axis and intersecting said eccentric chamber and including a sump cover disposed within said sump bore adjacent a face of said HCU block; and
   wherein said sump cover is identical to an outlet cap enclosing a pump bore of the hydraulic control unit.

7. The hydraulic control unit as set forth in claim 1, wherein said HCU block defines a motor bore having a cylindrical shape extending along a motor axis to a floor and containing an electric motor for driving said rotating eccentric via a motor shaft; and
   wherein said electric motor includes a motor housing having a side wall with a generally cylindrical shape extending along said motor axis between a base end and a power end, with each of said base end and said power end extending parallel to one another and perpendicular to said motor axis, and with said power end surrounding an output bushing for rotatably supporting said motor shaft.

8. The hydraulic control unit as set forth in claim 7, further comprising:
   a mounting plate secured to said power end of said motor housing with a plurality of second fasteners; and wherein said HCU block defines a staked lip within said motor bore with said mounting plate secured between said staked lip and said floor of said motor bore to securely hold said electric motor within said motor bore.

9. The hydraulic control unit as set forth in claim 7, further comprising:
a spacer ring for locating said electric motor centrally within said motor bore and with said motor shaft centered along said motor axis, said spacer ring having a ring shape including an inner surface surrounding and engaging said output bushing of said motor housing, said spacer ring having a discontinuous outer surface configured to engage an annular inner wall of said HCU block extending parallel to said motor axis beyond said floor toward said eccentric chamber.

10. The hydraulic control unit as set forth in claim 7, further comprising:
a motor sleeve having a generally cylindrical shape surrounding said side wall of said motor housing and including an annular ring extending radially outwardly adjacent to said power end of said motor housing for engaging said floor of said motor bore;
wherein said motor sleeve is secured to said motor housing by resistance or laser welding;
wherein said HCU block defines a staked lip within said motor bore with said annular ring of said motor sleeve secured between said staked lip and said floor of said motor bore to securely hold said electric motor within said motor bore.

11. A hydraulic control unit comprising:
an HCU block defining an eccentric chamber containing a rotating eccentric;
a piston rod having a generally cylindrical shape extending along a pump axis between a first end and a second end and including a smooth exterior surface extending substantially the entire length between said first end and said second end;
an end cap disposed around said first end of said piston rod adjacent said rotating eccentric said end cap fixed to move axially with said piston rod and including a flange portion extending annularly outwardly from said piston rod;
a piston guide defining a first shoulder extending annularly and radially outwardly and facing toward said eccentric chamber;
said piston guide including a first tubular portion with a first inner surface having a cylindrical shape receiving said piston rod and allowing said piston rod to translate freely only in an axial direction;
a return spring extending between said first shoulder of said piston guide and said flange portion of said end cap for biasing said piston rod axially toward said rotating eccentric.

12. The hydraulic control unit as set forth in claim 11, wherein said piston guide includes a base surface extending annularly and radially outwardly from said first inner surface and facing away from said eccentric chamber with a second tubular portion extending axially from said base surface opposite said first tubular portion and including a second inner surface having a cylindrical shape and radially spaced apart from said piston rod to define a first throat therebetween; and
the hydraulic control unit further comprises a gland seal disposed in said first throat of said piston guide surrounding said piston rod to prevent leakage thereabout as said piston rod moves axially therethrough.

13. The hydraulic control unit as set forth in claim 11, further comprising:
an inlet check valve disposed in an inlet valve bore of said HCU block to allow fluid flow into said piston pump while preventing fluid flow in a reverse direction and including an inlet valve housing defining an inlet valve seat for sealingly receiving an inlet closing member;
an accumulator assembly disposed within an accumulator bore having a generally cylindrical shape extending into said HCU block transverse to said pump axis, said accumulator assembly including an accumulator piston with a coil spring biasing said accumulator piston away from an accumulator cap disposed in said accumulator bore adjacent a face of said HCU block; and
wherein said inlet valve bore is formed coaxial with said accumulator bore and wherein said inlet valve bore has a smaller diameter than said accumulator bore and extends axially therefrom away from said face of said HCU block.

14. A hydraulic control unit comprising:
an HCU block defining an eccentric chamber containing a rotating eccentric and defining a pump bore extending transversely from a face of said HCU block along a pump axis intersecting said eccentric chamber;
a piston pump including a piston rod and an outlet valve housing defining an outlet valve seat for receiving an outlet closing member separating a pumping chamber from an outlet fluid chamber;
an outlet spring retainer defining an internal ledge facing said eccentric chamber for engaging an outlet valve spring configured to bias said outlet closing member into said outlet valve seat, said outlet spring retainer including a plurality of tapered posts extending axially away from said eccentric chamber to engage an outlet cap for holding said piston pump in said pump bore of said HCU block; and
wherein said tapered posts are configured to deform by a predetermined amount during assembly.

15. The hydraulic control unit as set forth in claim 14, wherein said HCU block includes a staked lip within said pump bore for securing said outlet cap therein.

16. The hydraulic control unit as set forth in claim 14, wherein said outlet valve housing defines a pumping chamber for receiving a piston rod and having a volume varying as said piston rod is moved axially within said pumping chamber.

17. The hydraulic control unit as set forth in claim 14, further comprising: a piston rod having a generally cylindrical shape extending along said pump axis between a first end and a second end and including a smooth exterior surface extending substantially the entire length between said first end and said second end.

18. The hydraulic control unit as set forth in claim 14, further comprising:
a piston guide including a first tubular portion having a first inner surface with a cylindrical shape for receiving a piston rod and said first tubular portion having a first outer surface with a generally cylindrical shape with a return spring disposed thereabout for biasing said piston rod into contact with said rotating eccentric.

19. The hydraulic control unit as set forth in claim 18, wherein said piston guide includes a base surface extending annularly and radially outwardly from said first inner surface and facing away from said eccentric chamber with a second tubular portion extending axially from said base surface opposite said first tubular portion including a second inner surface defining a first throat; and the hydraulic control unit further comprises a gland seal disposed in said first throat of said piston guide surrounding said piston rod to prevent leakage thereabout as said piston rod moves axially therethrough.

20. A hydraulic control unit comprising:

an HCU block defining an eccentric chamber containing a rotating eccentric, said HCU block defining a motor bore having a cylindrical shape extending along a motor axis to a floor and containing an electric motor for driving said rotating eccentric via a motor shaft;

wherein said electric motor includes a motor housing having a side wall with a generally cylindrical shape extending along said motor axis between a base end and a power end;

a motor sleeve secured to said motor housing and including an annular ring extending radially outwardly adjacent said power end of said motor housing for engaging said floor of said motor bore;

wherein said HCU block defines a staked lip within said motor bore with said annular ring of said motor sleeve secured between said staked lip and said floor of said motor bore to securely hold said electric motor within said motor bore.

21. The hydraulic control unit as set forth in claim 20, wherein said motor sleeve defines a notch that is configured to receive a corresponding structure in the motor bore for alignment of the motor in a predetermined radial alignment.

22. The hydraulic control unit as set forth in claim 20, further comprising a cushion of damping material disposed between a bottom of the motor sleeve and the floor of the motor bore.

23. The hydraulic control unit as set forth in claim 20, further comprising a cushion of damping material extending between a side of the motor sleeve and a cylindrical side wall of the motor bore.

24. The hydraulic control unit as set forth in claim 20, further comprising the side wall of the motor bore defining a recess extending parallel to said motor axis; and a rubber damper disposed within said recess.

* * * * *